US008590051B2

(12) United States Patent
Watakabe et al.

(10) Patent No.: US 8,590,051 B2
(45) Date of Patent: Nov. 19, 2013

(54) INFORMATION PROCESSING APPARATUS AND REMOVABLE MEDIA MANAGEMENT METHOD

(75) Inventors: Takeshi Watakabe, Ome (JP); Yuji Fujiwara, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/276,016

(22) Filed: Oct. 18, 2011

(65) Prior Publication Data

US 2012/0166524 A1    Jun. 28, 2012

(30) Foreign Application Priority Data

Dec. 27, 2010  (JP) ................. 2010-290997
Jan. 31, 2011  (JP) ................. 2011-018966

(51) Int. Cl.
*G06F 7/04*      (2006.01)
*G06F 13/00*     (2006.01)
*G06F 11/30*     (2006.01)

(52) U.S. Cl.
USPC .............................. 726/26; 711/100; 713/194

(58) Field of Classification Search
None
See application file for complete search history.

(56) References Cited

U.S. PATENT DOCUMENTS

| 7,191,346 B2 * | 3/2007 | Abe et al. ................ 713/194 |
| 7,644,446 B2 * | 1/2010 | Strom et al. ................ 726/32 |
| 7,743,424 B2 * | 6/2010 | Lu et al. .................... 726/26 |
| 8,176,061 B2 * | 5/2012 | Swanbeck et al. ........... 707/755 |
| 2004/0025041 A1 | 2/2004 | Kitamura et al. |
| 2008/0225337 A1 | 9/2008 | Yano |
| 2009/0298593 A1 * | 12/2009 | Kobayashi et al. ............ 463/42 |

FOREIGN PATENT DOCUMENTS

| JP | 11-328089    | 11/1999 |
| JP | 2003-288128  | 10/2003 |
| JP | 2004-046452  | 2/2004  |
| JP | 2005-215671  | 8/2005  |
| JP | 2008-226121  | 9/2008  |
| JP | 2008-293527  | 12/2008 |
| JP | 2009-080898  | 4/2009  |

OTHER PUBLICATIONS

Japanese Patent Application No. 2011-018966; Office Action; Mailed Dec. 13, 2011 (with English translation).
Japanese Patent Application No. 2011-018966; Office Action; Mailed Feb. 28, 2012 (with English translation).
Intellectual Property High Court, 2007 (Gyo-Ke), No. 10239 (http://courts.go.jp/hanrei/pdf/20080306163050.pdf).
Intellectual Property High Court, 2007 (Gyo-Ke), No. 10369 (http://courts.go.jp/hanrei/pdf/20080625101726.pdf).

* cited by examiner

*Primary Examiner* — Wen-Tai Lin
(74) *Attorney, Agent, or Firm* — Blakely, Sokoloff, Taylor & Zafman LLP

(57) ABSTRACT

According to one embodiment, an information processing apparatus includes an identifier generation module, an identifier write module, an identifier storage, and a removable media control module. The identifier generation module generates a media identifier for a removable medium connected to the information processing apparatus. The identifier write module writes the generated media identifier in a predetermined area in the removable medium. The identifier storage stores the generated media identifier in an identifier list. The removable media control module permits use of a removable medium which is newly connected to the information processing apparatus if a media identifier included in the identifier list is written in a predetermined area in the newly connected removable medium.

10 Claims, 18 Drawing Sheets

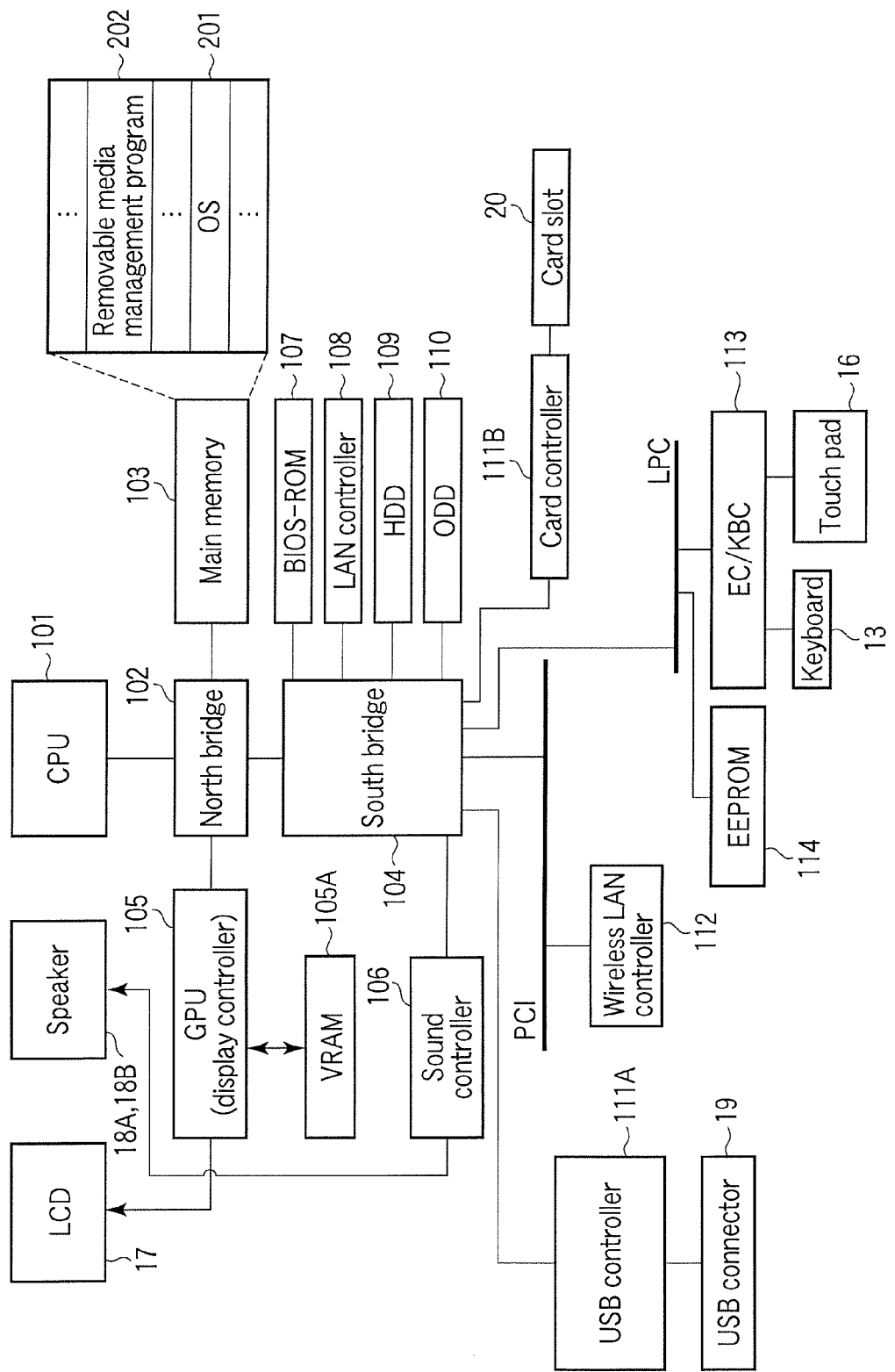
F I G. 2

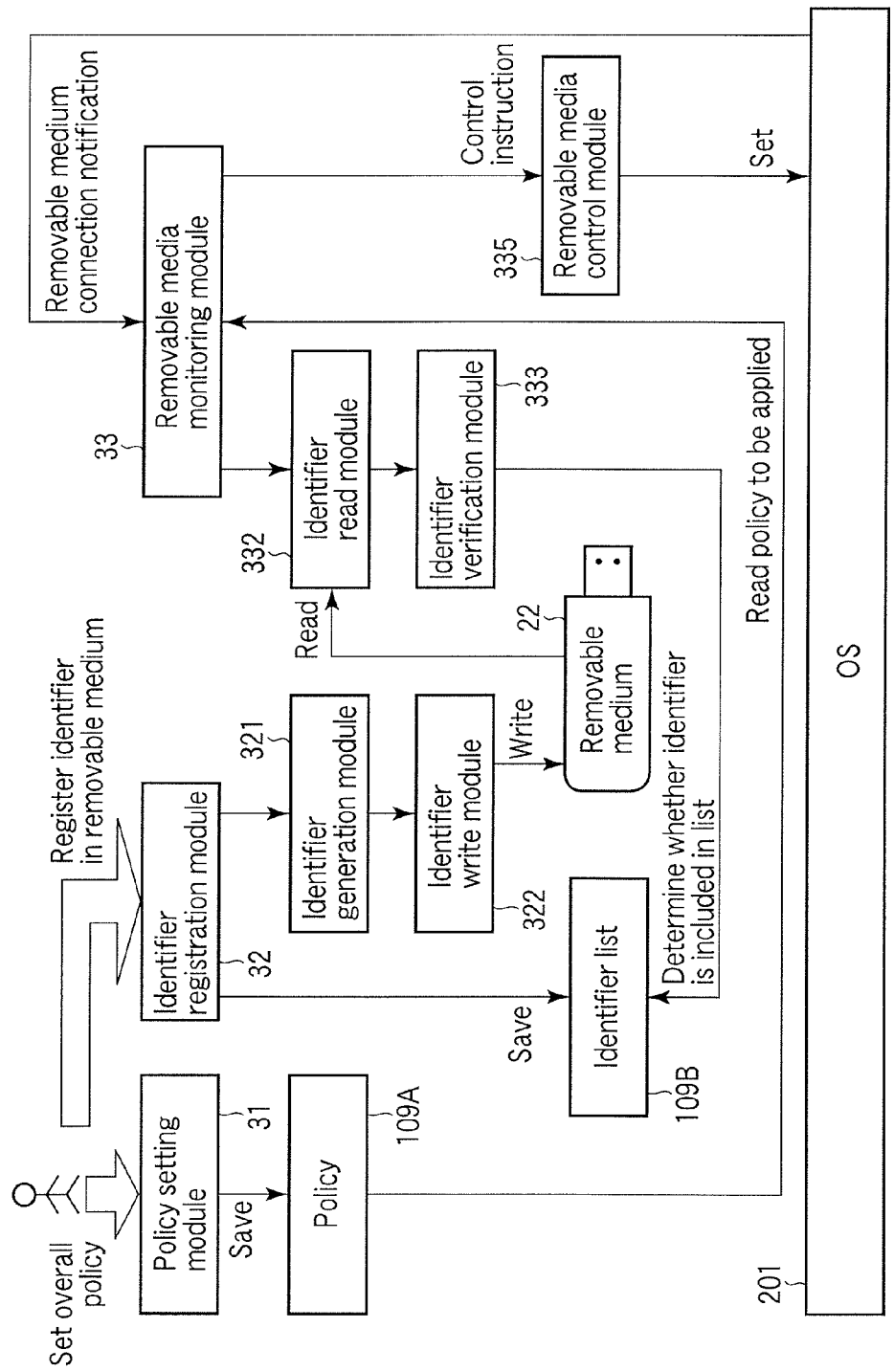
F I G. 6

| Policy | |
|---|---|
| Registered removable medium | Unregistered removable medium |
| Read/write permitted | Use inhibited |
F I G. 9
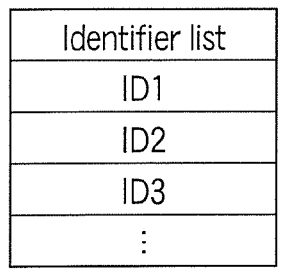
F I G. 10
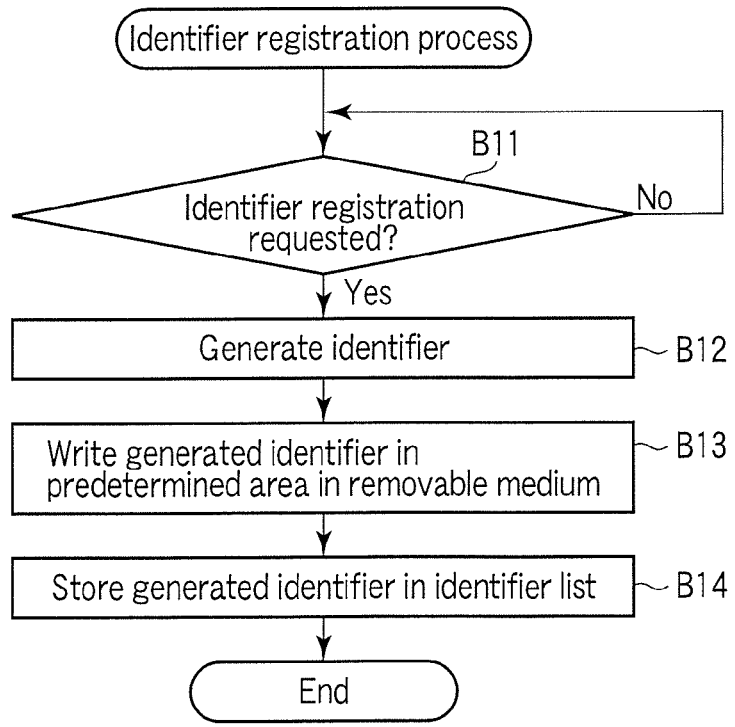
F I G. 11

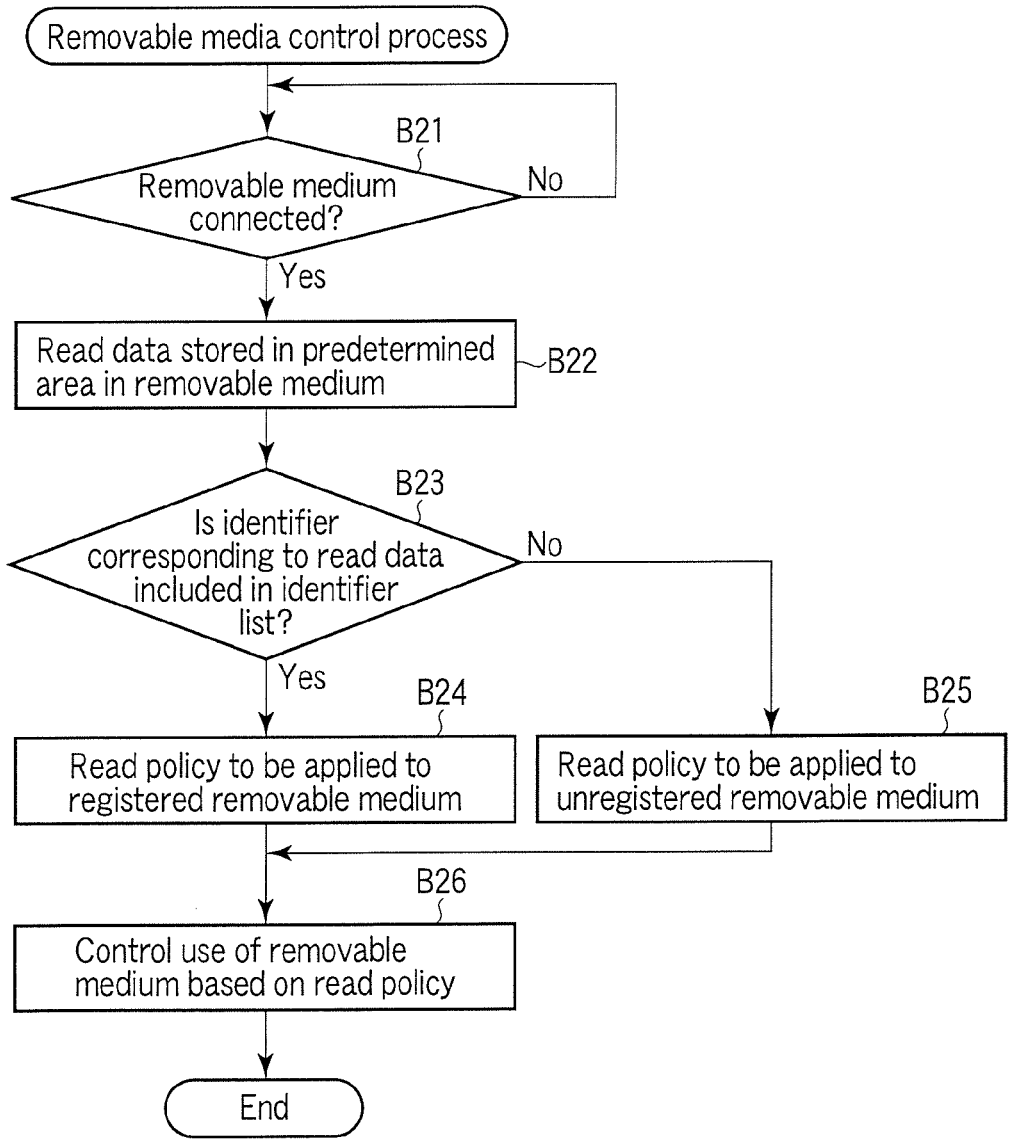
F I G. 12

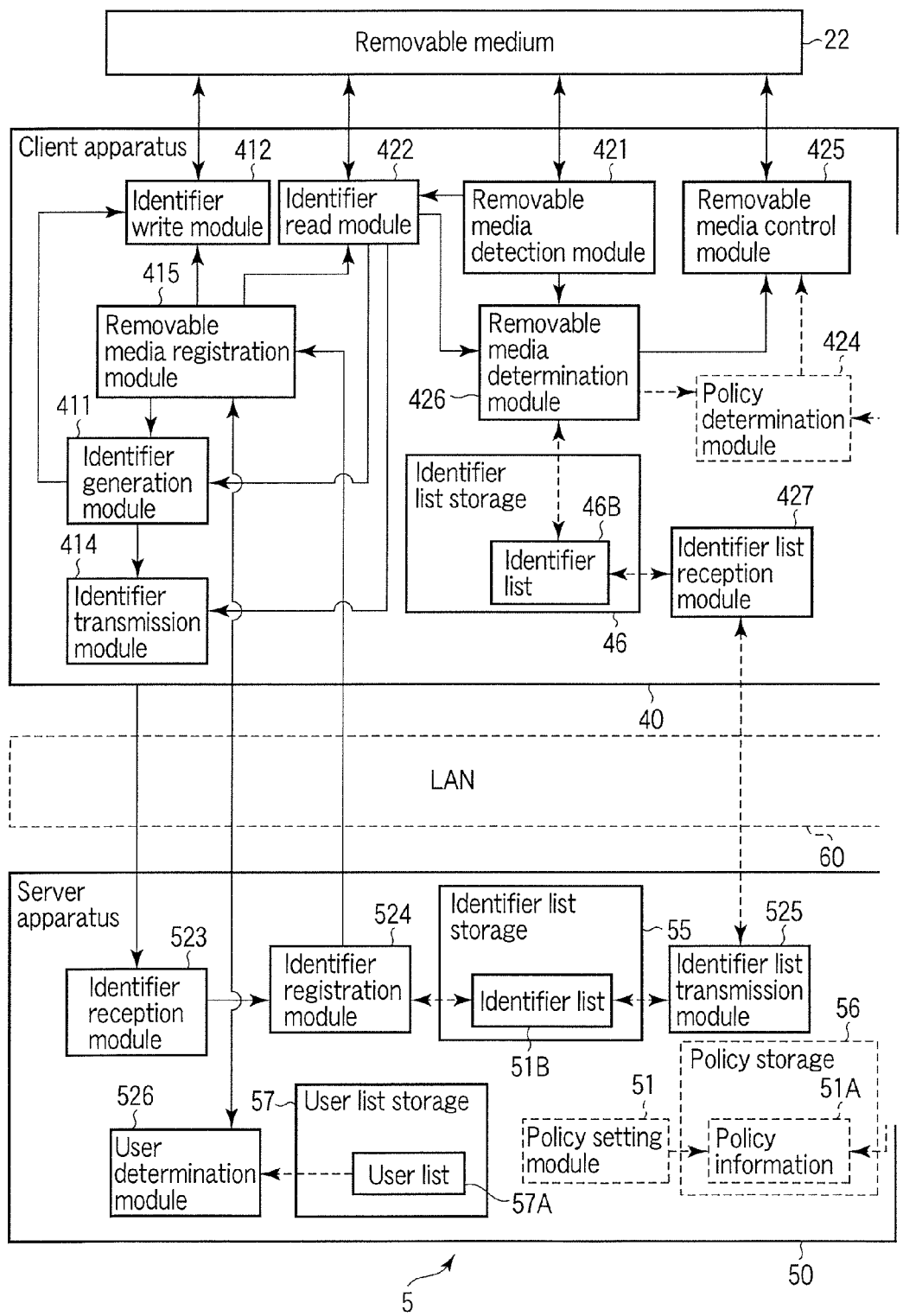
F I G. 15

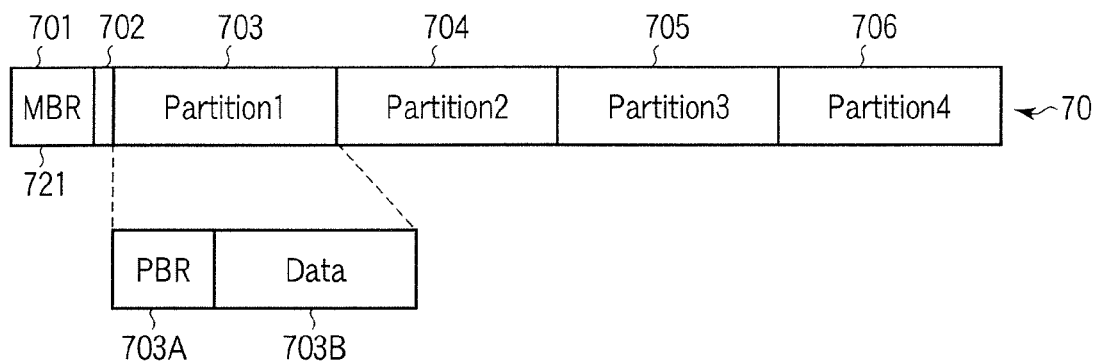
F I G. 16
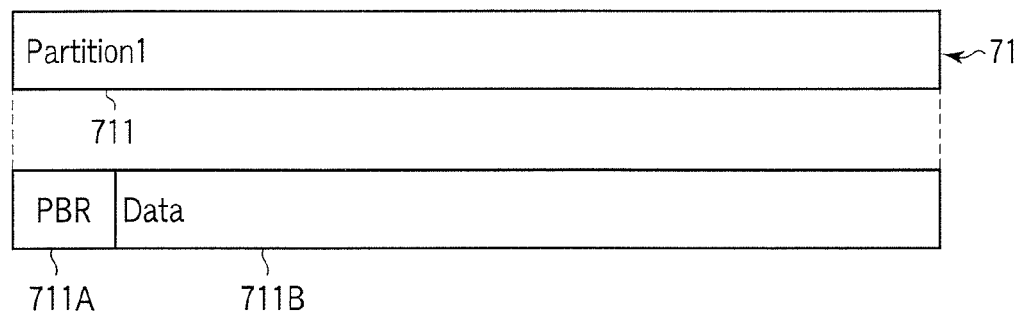
F I G. 17

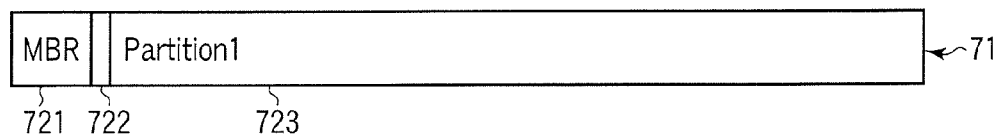
F I G. 18
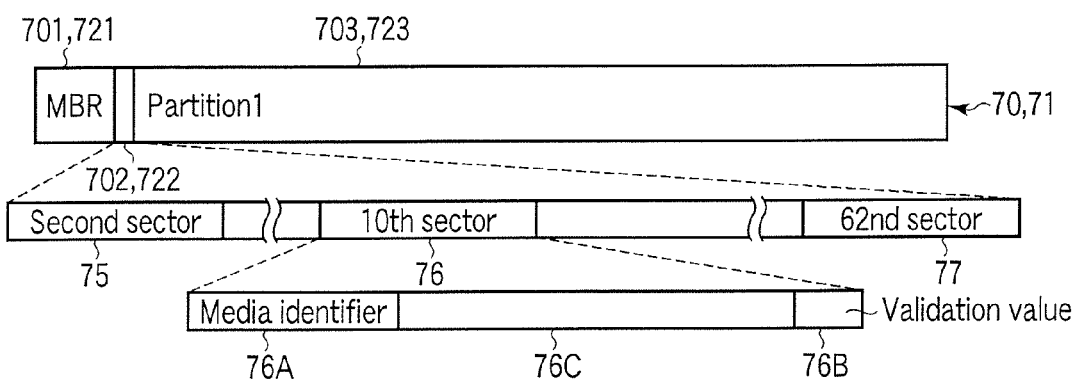
F I G. 19

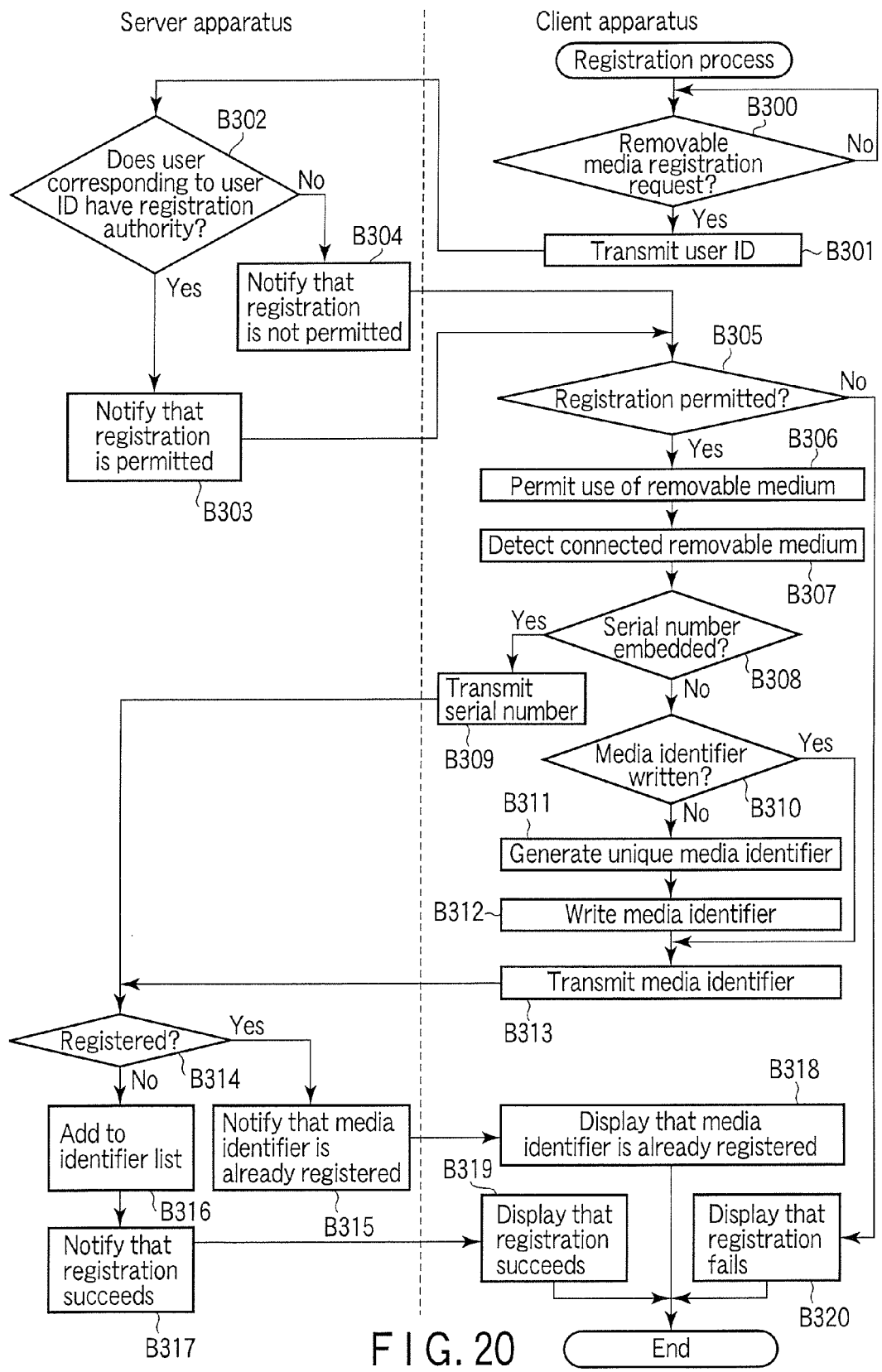
F I G. 20

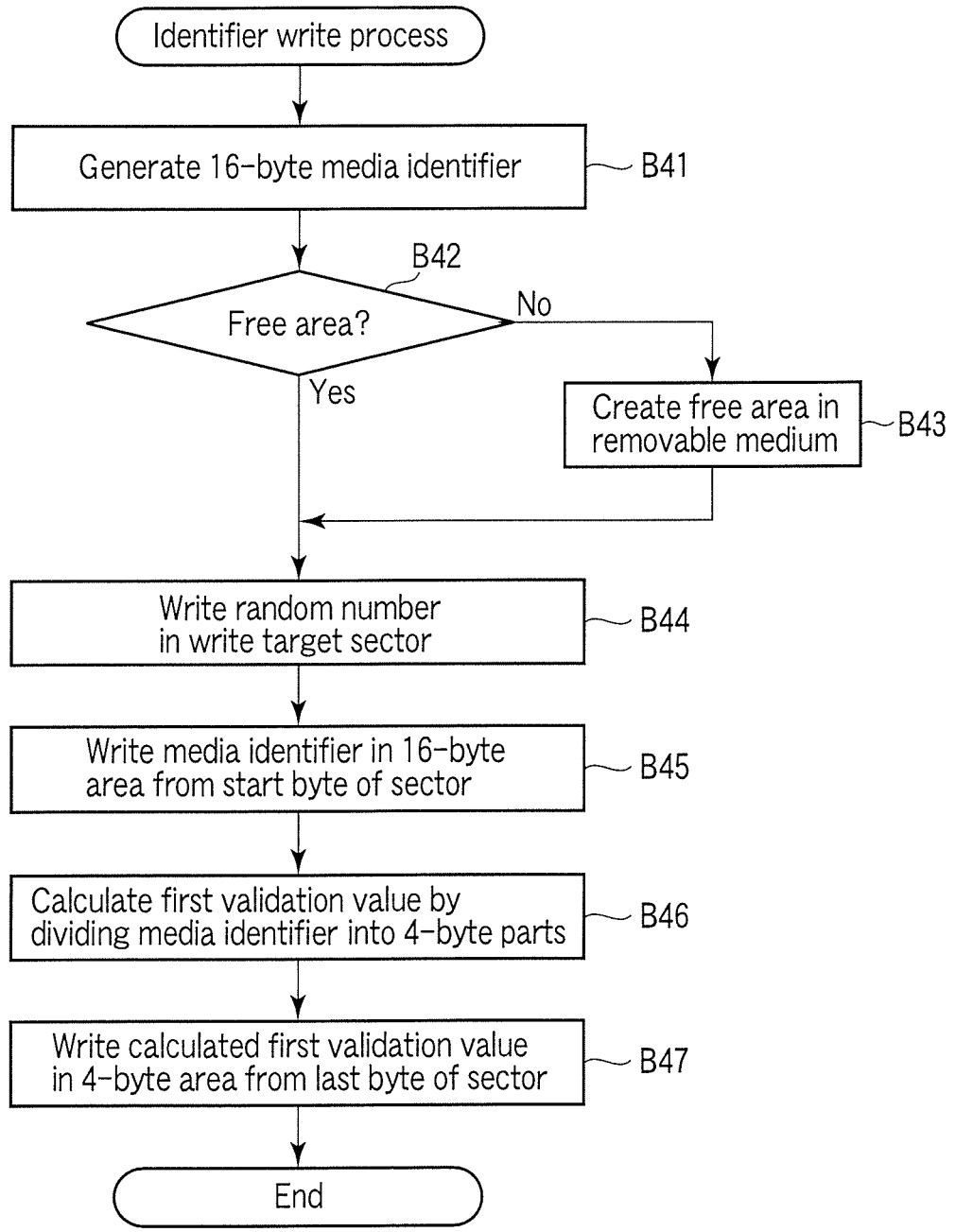
F I G. 21

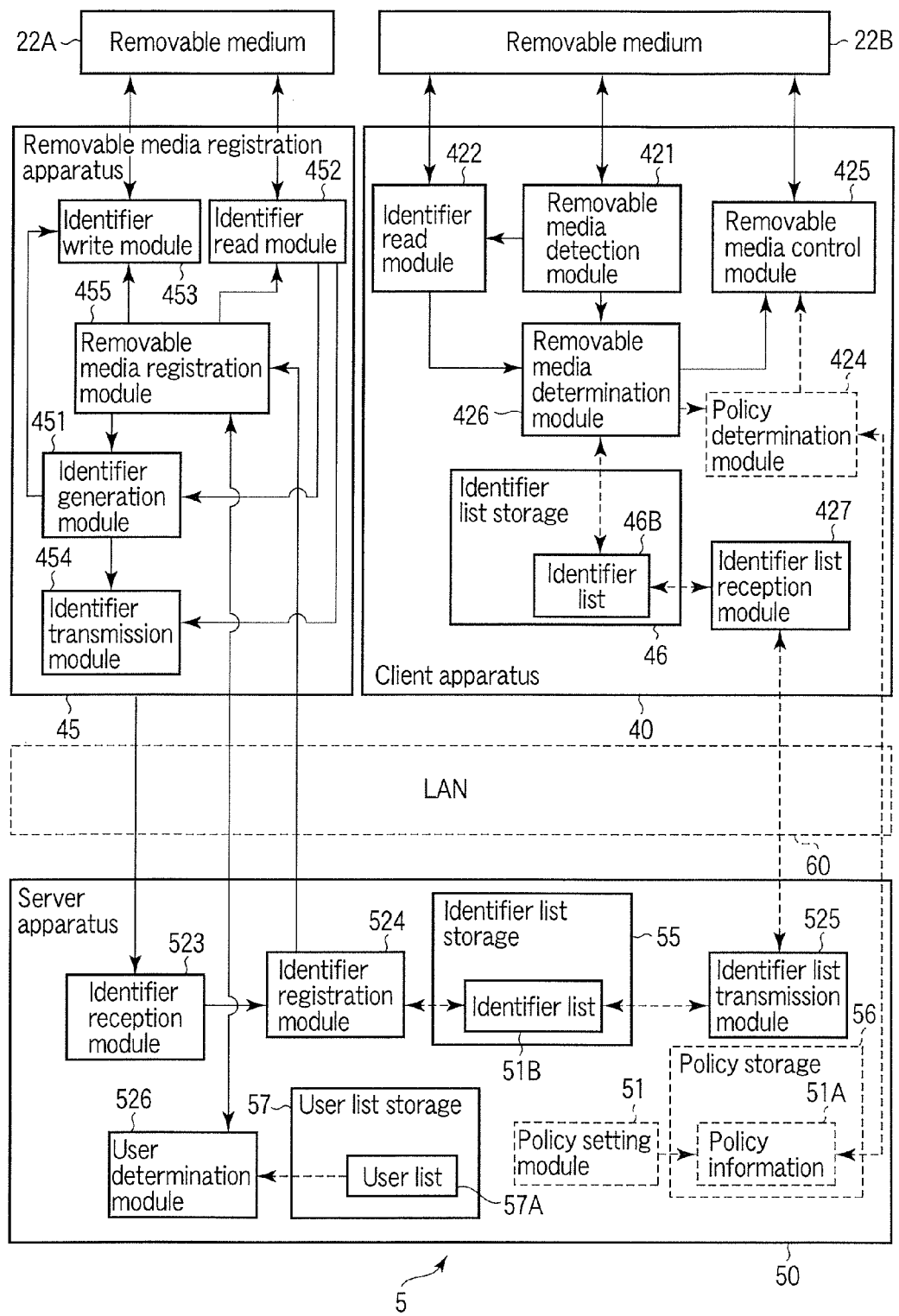
F I G. 24

INFORMATION PROCESSING APPARATUS AND REMOVABLE MEDIA MANAGEMENT METHOD

CROSS-REFERENCE TO RELATED APPLICATIONS

This application is based upon and claims the benefit of priority from prior Japanese Patent Applications No. 2010-290997, filed Dec. 27, 2010; and No. 2011-018966, filed Jan. 31, 2011, the entire contents of all of which are incorporated herein by reference.

FIELD

Embodiments described herein relate generally to an information processing apparatus to which removable media are connected, and a removable media management method applied to the apparatus.

BACKGROUND

Removable media such as a USB flash memory and SD card are generally used for carrying data between a plurality of computers. Using a removable medium, it is easy to read data stored in the removable medium into a computer and to write data stored in the computer in the removable medium.

On the other hand, since a security problem of, for example, sneaking confidential data out of a computer is posed, various methods of preventing data from being sneaked have been proposed.

For example, a technique which controls to permit use of only registered removable media has been proposed. With this technique, for example, an identifier (ID) of a removable medium, use of which is permitted in a computer, is pre-stored in the computer. When a removable medium is connected to the computer, it is determined whether use of the connected removable medium is permitted based on the stored ID of the removable medium. Then, data write accesses from the computer to the removable medium and read accesses of data stored in the removable medium can be controlled, thus suppressing sneaking data out of a computer.

However, an ID to be embedded in a removable medium such as a USB flash memory at the time of shipping of the removable medium depends on a vendor. Hence, no ID may be embedded in a removable medium or the same ID may be embedded in a plurality of removable media. It is difficult to control use of such removable media based on embedded IDs.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram showing the system arrangement of the information processing apparatus according to the first embodiment.

FIG. 6 is an exemplary conceptual diagram for explaining an example of the configuration for removable media management by the information processing apparatus according to the first embodiment.

FIG. 9 is a configuration example of policy information used by the removable media management program executed by the information processing apparatus according to the first embodiment.

FIG. 10 is an example of an identifier list used by the removable media management program executed by the information processing apparatus according to the first embodiment.

FIG. 11 is an exemplary flowchart showing an example of the procedure of identifier registration process executed by the information processing apparatus according to the first embodiment.

FIG. 12 is an exemplary flowchart showing an example of the procedure of removable media control process executed by the information processing apparatus according to the first embodiment.

FIG. 15 is an exemplary block diagram showing the arrangement of a removable media management system according to a third embodiment.

FIG. 16 is an exemplary conceptual view for explaining a configuration of a storage area in a removable medium, use of which is controlled by the removable media management system according to the third embodiment.

FIG. 17 is an exemplary conceptual view for explaining another configuration of a storage area in a removable medium, use of which is controlled by the removable media management system according to the third embodiment.

FIG. 18 is an exemplary conceptual view for explaining still another configuration of a storage area in a removable medium, use of which is controlled by the removable media management system according to the third embodiment.

FIG. 19 is an exemplary conceptual view showing an area in a removable medium in which a media identifier is stored by the removable media management system according to the third embodiment.

FIG. 20 is an exemplary flowchart showing an example of the procedure of identifier registration process executed by the removable media management system according to the third embodiment.

FIG. 21 is an exemplary flowchart showing an example of the procedure of identifier write process executed by the removable media management system according to the third embodiment.

FIG. 24 is an exemplary block diagram showing the arrangement of a removable media management system according to a fourth embodiment.

DETAILED DESCRIPTION

Various embodiments will be described hereinafter with reference to the accompanying drawings.

In general, according to one embodiment, an information processing apparatus includes an identifier generation module, an identifier write module, an identifier storage, and a removable media control module. The identifier generation module generates a media identifier for a removable medium connected to the information processing apparatus. The identifier write module writes the generated media identifier in a predetermined area in the removable medium. The identifier storage stores the generated media identifier in an identifier list. The removable media control module permits use of a removable medium which is newly connected to the information processing apparatus if a media identifier included in the identifier list is written in a predetermined area in the newly connected removable medium.

The first embodiment will be described hereinafter with reference to the drawings.

Figure 1:
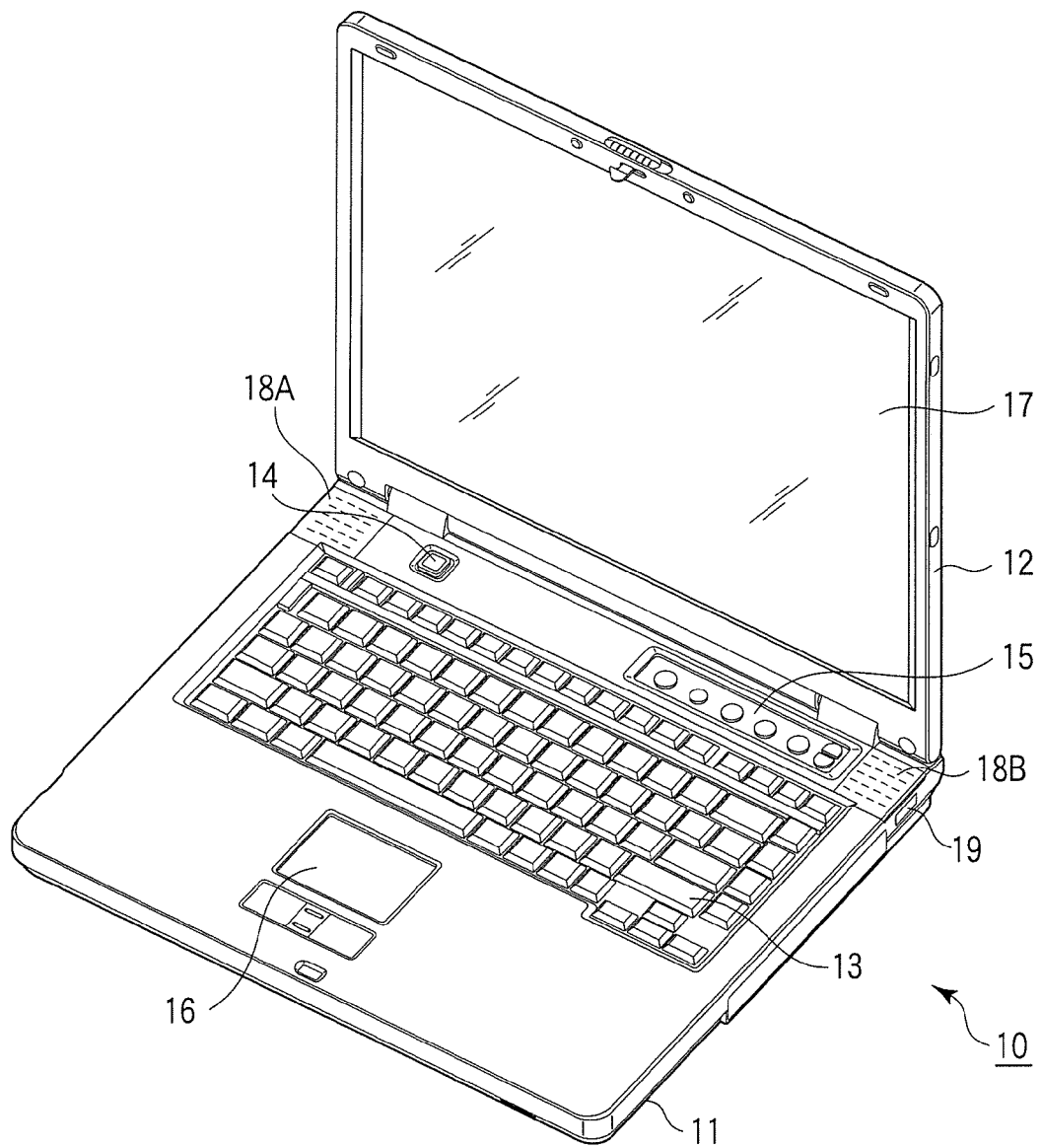
FIG. 1 is an exemplary perspective view showing the outer appearance of an information processing apparatus according to a first embodiment.

FIG. 1 is a perspective view showing the outer appearance of an information processing apparatus according to the first embodiment. This information processing apparatus is implemented as, for example, a notebook type personal computer 10. As shown in FIG. 1, this computer 10 includes a computer main body 11 and display unit 12. A liquid crystal display (LCD) 17 is built in the display unit 12. The display unit 12 is attached to the computer main body 11 to be pivotal between an open position where the upper surface of the computer main body 11 is exposed and a close position where the upper surface of the computer main body 11 is covered.

The computer main body 11 has a thin box-shaped housing. A keyboard 13, a power button 14 used for powering on/off the power supply of the computer 10, an input operation panel 15, a touch pad 16, speakers 18A and 18B, and the like are disposed on the top surface of the housing of the computer main body 11. Various operation buttons are provided on the input operation panel 15.

The right side surface of the computer main body 11 is provided with a USB connector 19 for connection to a USB cable or a USB device of, e.g. the universal serial bus (USB) 2.0 standard.

FIG. 2 is a block diagram showing the system arrangement of the computer 10.

As shown in FIG. 2, the computer 10 includes a central processing unit (CPU) 101, a north bridge 102, a main memory 103, a south bridge 104, a graphic processing unit (GPU) 105, a video random access memory (VRAM) 105A, a sound controller 106, a basic input/output system-read only memory (BIOS-ROM) 107, a local area network (LAN) controller 108, a hard disk drive (HDD) 109, an optical disk drive (ODD) 110, a USB controller 111A, a card controller 111B, a wireless LAN controller 112, an embedded controller/keyboard controller (EC/KBC) 113, and an electrically erasable programmable ROM (EEPROM) 114.

The CPU 101 is a processor which controls the operations of the respective modules in the computer 10. The CPU 101 executes an operating system (OS) 201, removable media management program 202, and various application programs, which are loaded from the HDD 109 into the main memory 103. The removable media management program 202 is software for managing use of a removable medium connected to the computer 10. This removable medium includes, for example, a USB flash memory, SD card, CompactFlash™ memory card, Memory Stick™, and external Serial ATA (eSATA)-connected or IEEE1394-connected storage devices.

The CPU 101 also executes a BIOS stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of executing communication with the GPU 105 via, e.g. a PCI EXPRESS serial bus.

The GPU 105 is a display controller which controls the LCD 17 that is used as a display monitor of the computer 10. A display signal, which is generated by the GPU 105, is sent to the LCD 17.

The south bridge 104 controls devices on a peripheral component interconnect (PCI) bus and devices on a low pin count (LPC) bus. The south bridge 104 includes an integrated drive electronics (IDE) controller for controlling the HDD 109 and ODD 110. The south bridge 104 also has a function of communicating with the sound controller 106.

The sound controller 106 is a sound source device and outputs audio data, which is a target of playback, to the speakers 18A and 18B. The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11g standard. The USB controller 111A communicates with an external device which supports, e.g. the USB 2.0 standard (the external device is connected via the USB connector 19). For example, the USB controller 111A executes read and write accesses of data to a removable medium such as a USB flash memory connected to the USB connector 19. The card controller 111B executes read and write accesses of data to a memory card such as an SD card, which is inserted into a card slot 20 arranged on the computer main body 11.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

A management example of a removable medium connected to the information processing apparatus will be described below with reference to FIGS. 3 and 4.

Figure 3:
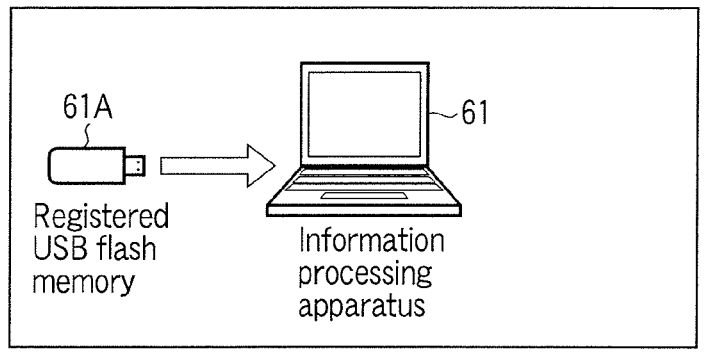
FIG. 3 is an exemplary conceptual view showing a connection example of a registered removable medium to the information processing apparatus.

FIG. 3 shows an example of a connection between a registered USB flash memory 61A and an information processing apparatus 61. The registered USB flash memory 61A has an identifier which is registered in advance. The information processing apparatus 61 permits, for example, reading data stored in the registered USB flash memory 61A and writing data in the registered USB flash memory 61A when the registered USB flash memory 61A is connected to the information processing apparatus 61.

Figure 4:
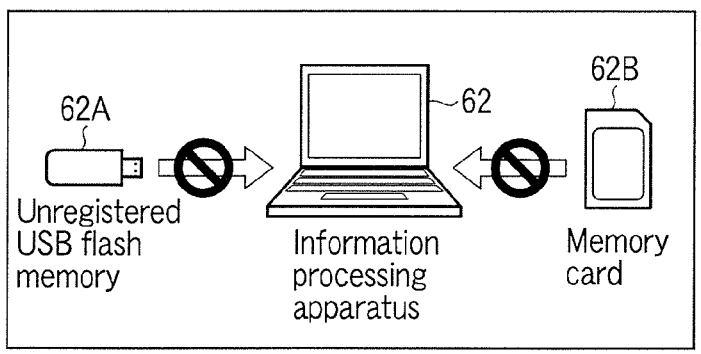
FIG. 4 is an exemplary conceptual view showing a connection example of an unregistered removable medium to the information processing apparatus.

On the other hand, FIG. 4 shows examples of a connection between an unregistered USB flash memory 62A and an information processing apparatus 62, and a connection between an unregistered memory card 62B and the information processing apparatus 62. The unregistered USB flash memory 62A has an unregistered identifier. The memory card 62B has no identifier. When the unregistered USB flash memory 62A is connected to the information processing apparatus 62, the information processing apparatus 62 inhibits, for example, reading data stored in the unregistered USB flash memory 62A and writing data in the unregistered USB flash memory 62A. When the unregistered memory card 62B is connected to the information processing apparatus 62, the information processing apparatus 62 inhibits, for example, reading data stored in the memory card 62B and writing data in the memory card 62B.

Since it is specified to embed a serial number in a device compatible with the USB 2.0 specification in a hardware manner, for example, serial numbers embedded in hardware are used as identifiers in the aforementioned USB flash memories 61A and 62A.

Figure 5:
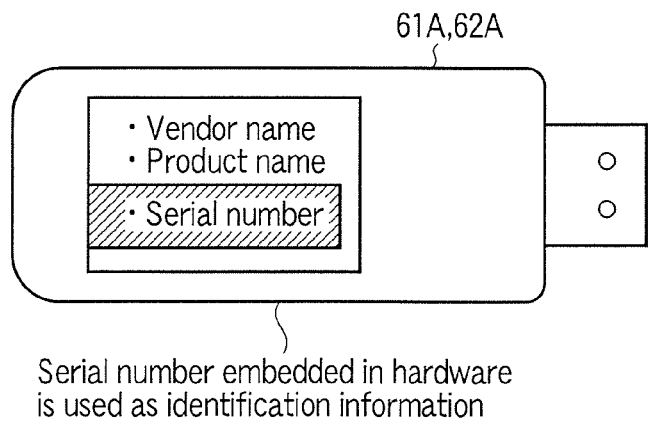
FIG. 5 is an exemplary conceptual view showing an example of an identifier to identify a removable medium.

FIG. 5 shows an example of a serial number embedded in hardware. In the USB flash memories 61A and 62A, identifier information (to be also referred to as hardware identification information) including, for example, a vendor name, product name, and serial number may be embedded in hardware. However, since whether to embed identifier information in practice and the specification of identifier information to be embedded depend on vendors, embedding of unique identifiers in the USB flash memories 61A and 62A is not guaranteed. That is, identifier information to be embedded in a removable medium such as the USB flash memories 61A and 62A does not provide a system to assign non-overlapping, unique identifier information to devices unlike a system that assigns unique MAC addresses to network devices across vendors. For this reason, an identical serial number may be embedded in a plurality of USB flash memories of the same model. Also, for example, no serial number may be embedded in USB flash memories. In such USB flash memories, it is impossible to identify each of the USB flash memories based on embedded serial numbers.

Furthermore, in the memory card 62B such as an SD card, no identifier information may be embedded or identifier information based on a specification different from the USB specification (for example, another configuration or format) may be embedded. For this reason, a method of managing USB flash memories may not apply to manage other types of removable media. When the memory card 62B such as an SD card is connected to a card reader compliant with the USB standard, identifier information embedded in the card reader may be used. However, when use of the card reader is controlled using the identifier information embedded in the card reader, use of all memory cards connected to that card reader is unwantedly permitted or inhibited.

In this embodiment, a unique media identifier is generated for a removable medium to be used, and the generated media identifier is written in a predetermined area in the removable medium. Then, the generated media identifier is added to an identifier list stored in, for example, the HDD 109 in the computer 10. Thus, when the removable medium is connected to the computer 10, use of the removable medium is controlled based on the media identifier written in the removable medium and the identifier list. In the following description, if a generated media identifier is written in a predetermined area in a removable medium, and is stored in the identifier list, the removable medium of interest will be referred to as a registered removable medium. Also, if a generated media identifier is not written in a predetermined area in a removable medium or if a media identifier written in the removable medium is not stored in the identifier list, the removable medium of interest will be referred to as an unregistered removable medium.

FIG. 6 shows an example of the configuration for removable media management by the computer 10. The removable media management is executed in three modes, that is, a policy setting mode, removable media registration mode and removable media monitor mode.

In the policy setting mode, policies to specify rules associated with use of removable media are set. More specifically, a policy setting module 31 sets policies according to operations (inputs) by a system administrator. The system administrator sets, for example, a policy to be applied to a registered removable medium (to be also referred to as a first policy hereinafter) and a policy to be applied to an unregistered removable medium (to be also referred to as a second policy hereinafter). The policy setting module 31 saves policy information 109A indicating the set policies in a storage device such as the HDD 109.

In the removable media registration mode, a removable medium 22 connected to the computer 10 is registered. More specifically, an identifier generation module 321 generates a media identifier for the connected removable medium 22. An identifier write module 322 writes the generated media identifier in a predetermined area in the removable medium 22. An identifier registration module 32 stores the generated media identifier in an identifier list 109B.

In the removable media monitor mode, use of a removable medium 22 newly connected to the computer 10 is controlled. More specifically, a device monitor module 33 detects that a removable medium 22 is newly connected to the computer 10 based on, for example, a notification (message) output from the OS 201. Then, an identifier read module 332 reads data written in a predetermined area in the newly connected removable medium 22. Then, an identifier verification module 333 determines whether a media identifier corresponding to the read data is included in the identifier list 109B, that is, whether the newly connected removable medium is a registered removable medium.

If the media identifier corresponding to the read data is included in the identifier list 109B, the device monitor module 33 reads the policy to be applied to a registered removable medium from the policy 109A, and controls use of the removable medium according to the read policy. On the other hand, if the media identifier corresponding to the read data is not included in the identifier list 109B, the device monitor module 33 reads the policy to be applied to an unregistered removable medium from the policy 109A, and controls use of the removable medium according to the read policy.

Figure 7:
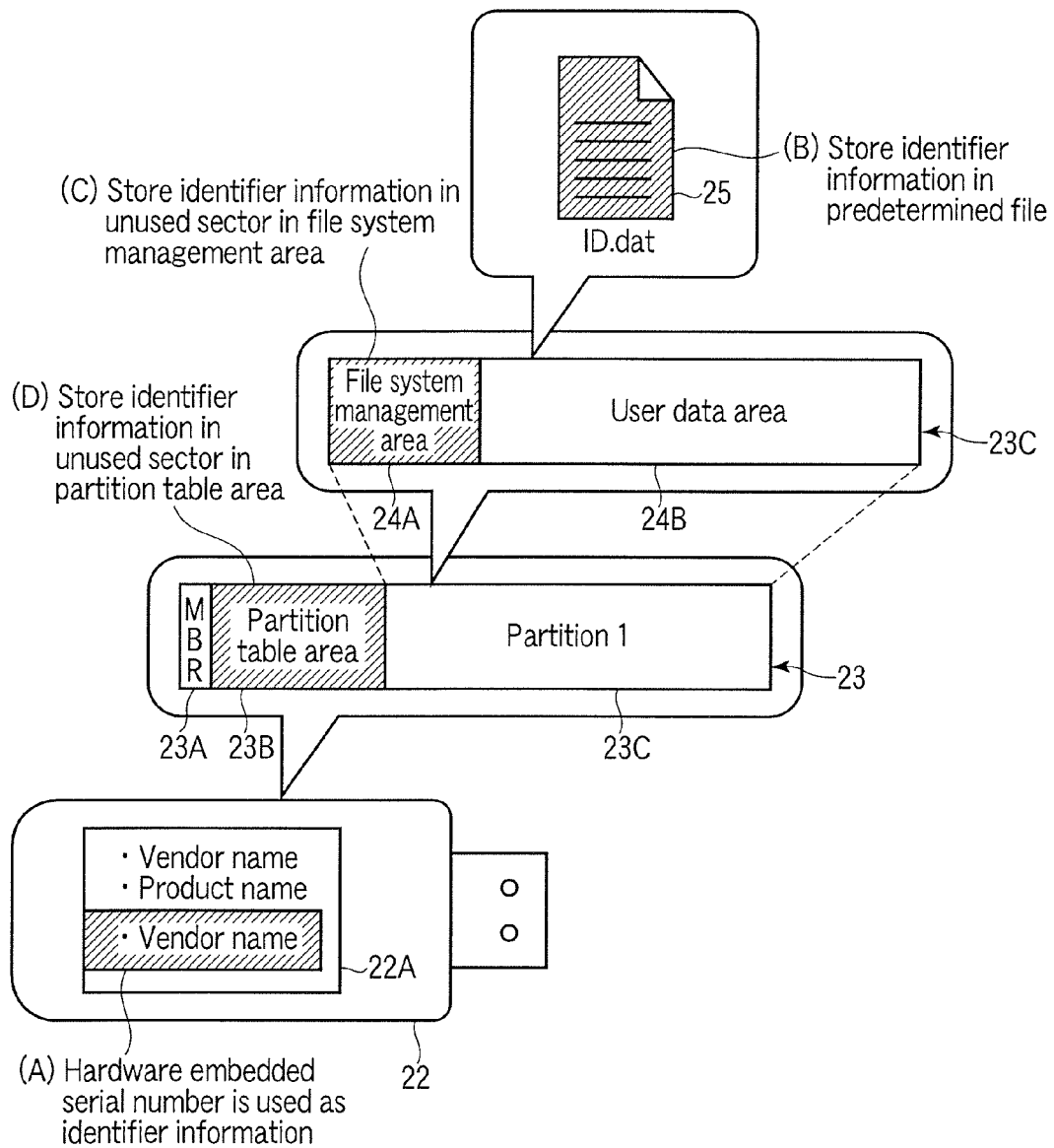
FIG. 7 is an exemplary conceptual view showing areas in a removable medium in which a media identifier is stored by the information processing apparatus according to the first embodiment.

FIG. 7 shows an example of a predetermined area in the removable medium 22 in which the media identifier is written. In the removable medium 22, identifier information 22A including, for example, a vendor name, product name and serial number may be embedded in hardware (for example, a ROM). However, as has been described above with reference to FIG. 5, identifier information may have a different configuration or format depending on the types of removable media, and identical identifier information may be embedded in a plurality of removable media, and no identifier information may be embedded in a removable medium. Hence, it is difficult to control use of removable media connected to the computer 10 using the hardware-embedded identifier information 22A.

Hence, in this embodiment, a media identifier for the removable medium 22 is generated, and the generated media identifier is written in a predetermined area in the removable medium 22. When the removable medium 22 is connected to the computer 10, use of the removable medium 22 is controlled based on the data written in the predetermined area (data corresponding to the media identifier).

The media identifier is written in, for example, a predetermined file (identifier file) 25 stored in a user data area 24B. When the removable medium 22 is connected to the computer 10, whether the removable medium 22 is a registered removable medium is determined based on this data written in the predetermined file 25.

Alternatively, the media identifier is written in, for example, a free area (to be also referred to as an unused area hereinafter) in a file system management area 24A allocated in the removable medium 22. With the aforementioned method of writing the media identifier in the predetermined file 25, if this predetermined file 25 is copied to an area in another removable medium, that removable medium may be recognized as a registered removable medium. However, since the media identifier is written in a free area (free space) in the file system management area 24A, the media identifier stored in the removable medium 22 can be prevented from being copied to an area in another removable medium.

Furthermore, the media identifier may be written in, for example, a free area (unused area) in a partition table area 23B allocated in the removable medium 22. Since the media identifier is written in a free area in the partition table area 23B, the media identifier stored in the removable medium 22 can be prevented from being copied to an area in another removable medium. Also, if the removable medium 22 is formatted, since the media identifier written in the partition table area 23B is not erased, the removable medium 22 can be identified based on the written media identifier even after formatting.

Since the media identifier is written in a predetermined area in the removable medium 22, and is stored in the identifier list 109B, the removable medium 22 can be individually recognized based on the written media identifier when the removable medium 22 is connected to the computer 10. Thus, use of the removable medium 22 can be controlled according to the policy.

Figure 8:
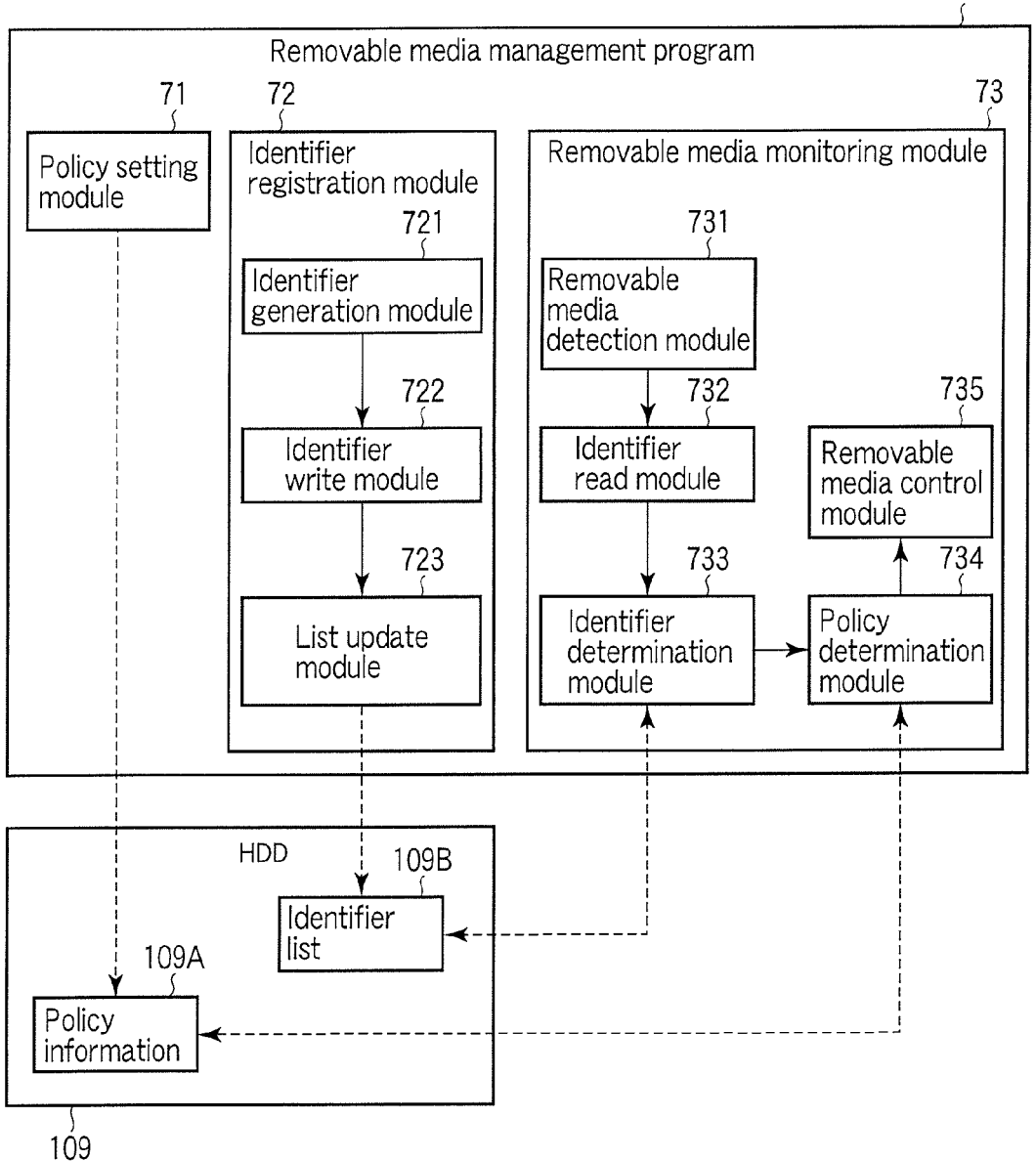
FIG. 8 is an exemplary block diagram showing an example of the functional configuration of a removable media management program executed by the information processing apparatus according to the first embodiment.

The functional configuration of the removable media management program 202 will be described below with reference to FIG. 8. The removable media management program 202 has a configuration to implement the operations in the policy setting mode, identifier registration mode and removable media monitor mode, which have been described above with reference to FIG. 6.

The removable media management program 202 includes a policy setting module 71, an identifier registration module 72 and a removable media management module 73.

The policy setting module 71 sets control rules in the policy information 109A. The set control rules are used for controlling use of a removable medium connected to the computer 10. The policy information includes, for example, a first policy to be applied to a registered removable medium and a second policy to be applied to an unregistered removable medium. The policy setting module 71 displays, for example, a setting screen used to set policies. The policy setting module 71 saves the first policy and the second policy in the policy information 109A according to user operations using the setting screen.

FIG. 9 shows a configuration example of the policy information 109A.

The policy information 109A includes, for example, policies [registered removable medium] and [unregistered removable medium]. The policy [registered removable medium] indicates a policy to be applied to a registered removable medium. The policy [unregistered removable medium] indicates a policy to be applied to an unregistered removable medium. In the policies [registered removable medium] and [unregistered removable medium], for example, values indicating rules such as "read/write permitted", "write inhibited", and "use inhibited" are set. The value "read/write permitted" indicates that reading data from a removable medium and writing data to the removable medium are permitted. The value "write inhibited" indicates that reading data from a removable medium is permitted and writing data to the removable medium is inhibited. The value "use inhibited" indicates that reading data from a removable medium and writing data to the removable medium are inhibited. Note that in the policies [registered removable medium] and [unregistered removable medium], not only these three rules but also various other rules to control accesses to a removable medium can be set. For example, in each of the policies [registered removable medium] and [unregistered removable medium], for example, values "valid", "invalid", "permitted", and "inhibited" may be set.

In the example of the policy information 109A shown in FIG. 9, the value "read/write permitted" is set in the policy [registered removable medium], and the value "use inhibited" is set in the policy [unregistered removable medium]. When the value "read/write permitted" is set in the policy [registered removable medium], reading and writing data from and to a registered removable medium are permitted. When the value "use inhibited" is set in the policy [unregistered removable medium], reading and writing data from and to an unregistered removable medium are inhibited.

The identifier registration module 72 includes an identifier generation module 721, identifier write module 722, and list update module 723.

The identifier generation module 721 generates a media identifier for a removable medium connected to the computer 10. The media identifier is a value that can uniquely identify the removable medium to be associated. The identifier generation module 721 generates the media identifier including, for example, alphanumeric characters and symbols using (combining) a manufacture number (serial number) of the computer 10, a generation date and time, and a random number. The identifier generation module 721 may use a globally unique identifier (GUID) generated using, for example, an application programming interface (API) as the media identifier. The identifier generation module 721 outputs the generated media identifier to the identifier write module 722.

The identifier write module 722 writes the media identifier output from the identifier generation module 721 in a predetermined area in the connected removable medium. As has been described above with reference to FIG. 7, the identifier write module 722 writes the media identifier in, for example, a free area in a partition table area allocated in the removable medium, a free area in a file system management area allocated in the removable medium, or a predetermined data file stored in a user data area allocated in the removable medium. Then, the identifier write module 722 outputs the media identifier to the list update module 723.

The list update module 723 stores the media identifier, which is output from the identifier write module 722, in the identifier list 109B stored in the HDD 109. Therefore, every time a registration request of a removable medium is issued, a media identifier associated with that removable medium (a media identifier generated for that removable medium) is added to the identifier list 109B. That is, the identifier list 109B includes media identifiers corresponding to registered removable media.

FIG. 10 shows a configuration example of the identifier list 109B.

The identifier list 109B includes, for example, one or more media identifiers. In the identifier list 109B, if a new removable medium connected to the computer 10 is registered, a new media identifier for that removable medium is stored (added). In the example shown in FIG. 10, the identifier list 109B includes a media identifier "ID1" for a first removable medium, a media identifier "ID2" for a second removable medium, and a media identifier "ID3" for a third removable medium.

The removable media monitor module 73 includes a removable media detection module 731, an identifier read module 732, an identifier determination module 733, a policy decision module 734, and a removable media control module 735.

The removable media detection module 731 detects that a removable medium is newly connected to the computer 10. The removable media detection module 731 detects, for example, a connection of a USB flash memory to the USB connector 19 and an insertion of a removable medium such as an SD card into the card slot 20. The removable media detection module 731 detects a connection between a removable medium and the computer 10 using, for example, a notification (for example, a message) output from the OS 201. The removable media detection module 731 notifies the identifier read module 732 that the removable medium is newly connected to the computer 10.

The identifier read module 732 reads data stored in a predetermined area in the connected removable medium in response to the notification from the removable media detection module 731. This predetermined area is an area specified to store a media identifier generated for that removable medium. More specifically, the identifier read module 732 reads data written in, for example, a predetermined area in a partition table area allocated in the removable medium, a predetermined area in a file system management area allocated in the removable medium, or a predetermined data file stored in a user data area allocated in the removable medium. Then, the identifier read module 732 outputs the read data to the identifier determination module 733.

The identifier determination module 733 determines whether the identifier list 109B stored in the HDD 109 includes a media identifier corresponding to the data output from the identifier read module 732. In other words, the identifier determination module 733 determines whether the media identifier included in the identifier list 109B is written in the predetermined area in the newly connected removable medium.

If the identifier list 109B includes the media identifier corresponding to the data output from the identifier read module 732, the identifier determination module 733 determines that the connected removable medium is a registered removable medium. Then, the identifier determination module 733 notifies the policy decision module 734 that the connected removable medium is a registered removable medium.

On the other hand, if the identifier list 109B does not include any media identifier corresponding to the data output from the identifier read module 732, the identifier determination module 733 determines that the connected removable medium is an unregistered removable medium. Then, the identifier determination module 733 notifies the policy decision module 734 that the connected removable medium is an unregistered removable medium.

The policy decision module 734 reads a policy from the policy information 109A stored in the HDD 109 in accordance with the notification from the identifier determination module 733. That is, if the policy decision module 734 is notified that the connected removable medium is a registered removable medium, the policy decision module 734 reads the policy (first policy) to be applied to a registered removable medium from the policy information 109A. On the other hand, if the policy decision module 734 is notified that the connected removable medium is an unregistered removable medium, the policy decision module 734 reads the policy (second policy) to be applied to an unregistered removable medium from the policy information 109A. The policy decision module 734 outputs the read policy to the removable media control module 735.

The removable media control module 735 controls use of the connected removable medium based on the policy output from the policy decision module 734. For example, the removable media control module 735 controls permission or inhibition of use of the connected removable medium based on the policy output from the policy decision module 734.

For example, if the connected removable medium is a registered removable medium, and the read policy has the value "read/write permitted", the removable media control module 735 controls to permit reading data stored in the removable medium and writing data in the removable medium. Also, for example, if the connected removable medium is an unregistered removable medium, and the read policy has the value "use inhibited", the removable media control module 735 controls to inhibit reading data stored in the removable medium and writing data in the removable medium. Note that the removable media control module 735 executes the aforementioned removable media use control via, for example, the OS 201.

With the aforementioned configuration, use of a removable medium connected to the computer 10 can be controlled. When a removable medium is registered, the identifier generation module 721 generates a media identifier for that removable medium. Then, the identifier write module 722 writes the generated media identifier in a predetermined area in the removable medium. The list update module 723 stores the generated media identifier in the identifier list 109B. Then, when the removable medium is newly connected to the computer 10, the identifier determination module 733 can determine whether the removable medium of interest is a registered or unregistered removable medium based on data written in the predetermined area in that removable medium and the identifier list 109B. Then, the removable media control module 735 can control use of the newly connected removable medium in accordance with either the first policy or the second policy based on this determination result.

An example of the procedure of identifier registration process executed by the computer 10 will be described below with reference to the flowchart shown in FIG. 11.

The identifier registration module 72 determines whether a registration request of a media identifier, which is to be associated with a removable medium connected to the computer 10, is issued (block B11). If no media identifier registration request is issued (NO in block B11), the identifier registration module 72 again determines whether a media identifier registration request is issued by returning to block B11.

If the media identifier registration request is issued (YES in block B11), the identifier generation module 721 generates a media identifier for the removable medium (block B12). The identifier write module 722 writes the generated media identifier in a predetermined area in the removable medium (block B13). Then, the list update module 723 adds the generated media identifier to the identifier list 109B stored in the HDD 109 (block B14).

An example of the procedure of removable media control processing will be described below with reference to the flowchart shown in FIG. 12.

The removable media detection module 731 determines whether a removable medium is newly connected to the computer 10 (block B21). If a removable medium is not newly connected to the computer 10 (NO in block B21), and the removable media detection module 321 again determines whether a removable medium is newly connected to the computer 10 by returning to block B21.

If the removable medium is newly connected to the computer 10 (YES in block B21), the identifier read module 732 reads data stored in a predetermined area in the removable medium (block B22). Then, the identifier determination module 733 determines whether a media identifier corresponding to the read data is included in the identifier list 109B (block B23).

If the media identifier corresponding to the read data is included in the identifier list 109B (YES in block B23), the policy decision module 734 reads the policy to be applied to a registered removable medium from the policy information 109A stored in the HDD 109 (block B24). On the other hand, if the media identifier corresponding to the read data is not included in the identifier list 109B (NO in block B23), the policy decision module 734 reads the policy to be applied to an unregistered removable medium from the policy information 109A stored in the HDD 109 (block B25).

Then, the removable media control module 735 controls use of the removable medium based on the policy read in block 324 or 325 (block B26).

Figure 13:
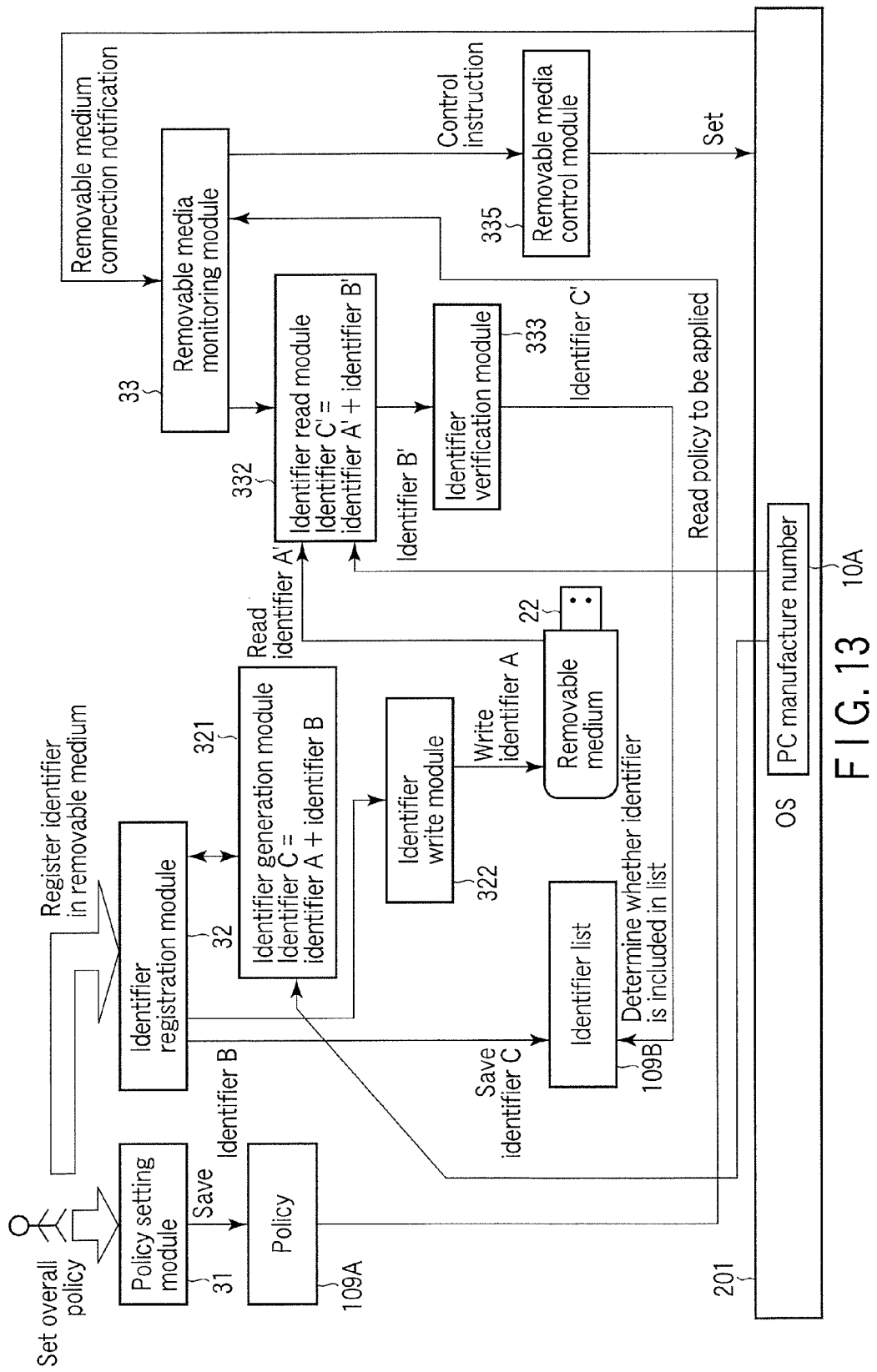
FIG. 13 is an exemplary conceptual diagram for explaining another example of the configuration for removable media management according to the first embodiment.

Another example of the configuration for the removable media management by the computer 10 will be described below with reference to FIG. 13. In the example shown in FIG. 13, a media identifier including a device identifier stored in a predetermined area in the computer 10 (that is, a device identifier associated with the computer 10) is generated. This device identifier is, for example, a manufacture number (serial number) 10A of the computer 10.

As in the example shown in FIG. 6, the removable media management is executed in the three modes, that is, the policy setting mode, removable media registration mode and removable media monitor mode.

In the policy setting mode, policies to specify rules associated with use of removable media are set. More specifically, the policy setting module 31 sets policies according to operations (inputs) by the system administrator. The system administrator sets, for example, a policy to be applied to a registered removable medium and a policy to be applied to an unregistered removable medium. The policy setting module 31 saves the policy information 109A indicating the set policies in a storage device such as the HDD 109.

In the removable media registration mode, a removable medium 22 connected to the computer 10 is registered. More specifically, the identifier generation module 321 generates a media identifier A using, for example, a date and time and random number. The identifier generation module 321 sends an inquiry to, for example, the OS 201 to receive the manufacture number (device identifier) 10A of the computer 10 as a media identifier B. Then, the identifier generation module 321 generates a media identifier C by combining (concatenating) the media identifiers A and B.

Next, the identifier write module 322 writes the generated media identifier A in a predetermined area in the removable medium 22. The identifier registration module 32 stores the generated media identifier C in the identifier list 109B.

In the removable media monitor mode, use of a removable medium 22 newly connected to the computer 10 is controlled. More specifically, the device monitor module 33 detects that a removable medium 22 is newly connected to the computer 10 based on, for example, a notification (message) output from the OS 201.

Then, the identifier read module 332 reads data (to be referred to as an identifier A' hereinafter) written in a predetermined area in the newly connected removable medium 22. Also, the identifier read module 332 sends an inquiry to, for example, the OS 201 to receive the manufacture number 10A (to be referred to as an identifier B' hereinafter) of the computer 10. Then, the identifier read module 332 generates an identifier C' by combining the read identifiers A' and B'.

Next, the identifier verification module 333 determines whether the generated identifier C' is included in the identifier list 109B. If the generated identifier C' is included in the identifier list 109B, the device monitor module 33 reads the policy to be applied to a registered removable medium from the policy 109A, and controls use of the removable medium according to the read policy. On the other hand, if the generated identifier C' is not included in the identifier list 109B, the device monitor module 33 reads the policy to be applied to an unregistered removable medium from the policy 109A, and controls use of the removable medium according to the read policy.

By using the media identifier including the device identifier, as described above, the removable medium 22 and computer 10 can be associated with each other to manage use of the removable medium 22. That is, the control can be made to permit use of the removable medium 22 in only a combination of the removable medium 22 and the computer 10 used upon registration of this removable medium 22.

Meanwhile, in an environment in which a large number of computers are connected within a network such as an in-house LAN, a plurality of removable media may be used in a plurality of computers connected within the network. In such environment, use of a plurality of removable media may be managed using the same policy.

For example, a removable medium registered in a first computer connected to the network is used not only in this first computer but also in a second computer connected to the network. In this case, it is troublesome to also register the removable medium, which has already been registered in the first computer, in the second computer in terms of process for registration.

Figure 14:
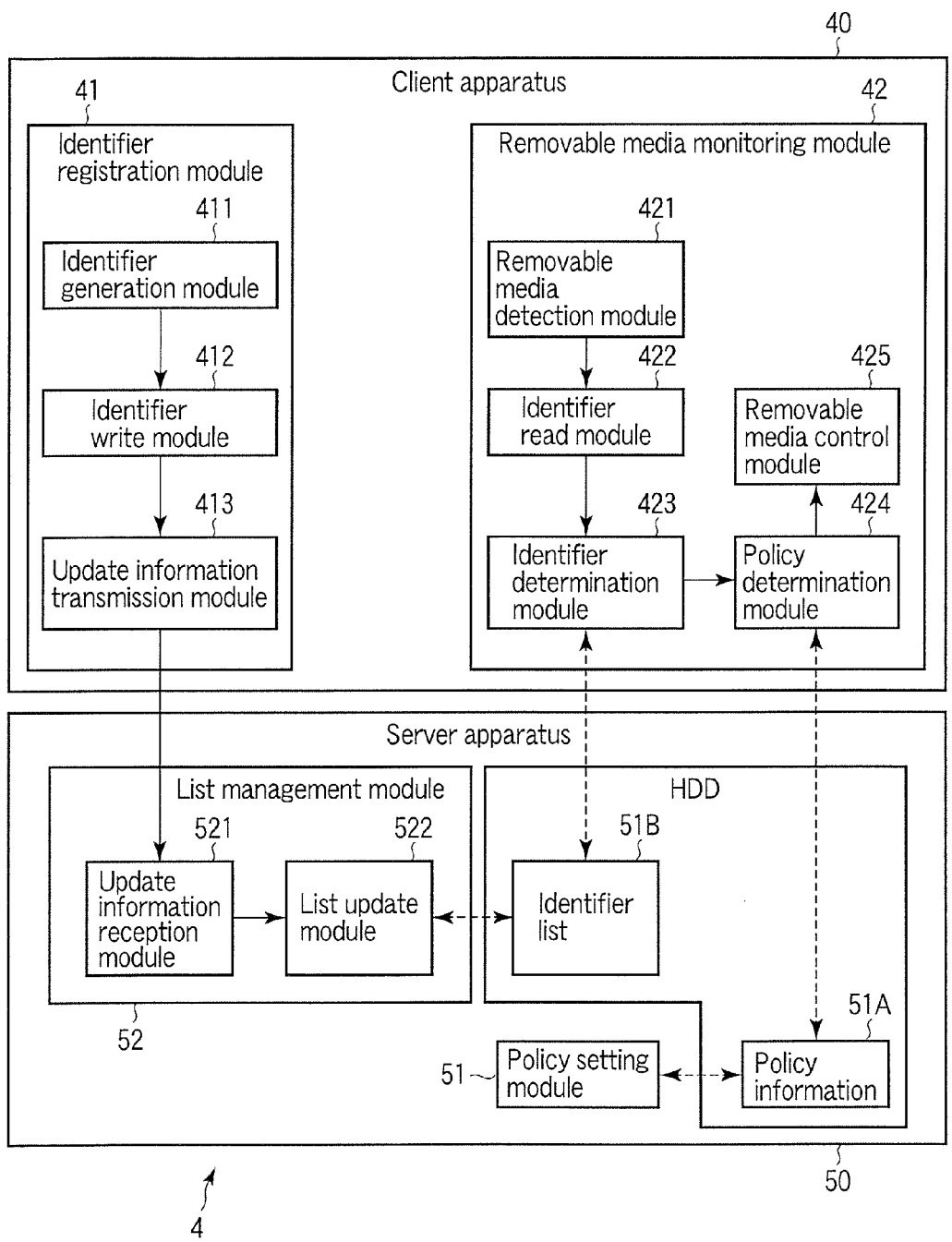
FIG. 14 is an exemplary block diagram showing the arrangement of a removable media management system according to a second embodiment.

FIG. 14 shows an example of the configuration of a removable media management system 4 according to the second embodiment. The removable media management system 4 includes, for example, a server apparatus 50 and one or more client apparatuses 40. The server apparatus 50 and client apparatuses 40 are interconnected via a network. The server apparatus 50 may be implemented by, for example, a server computer. Each client apparatus 40 may be implemented by, for example, a personal computer. The server apparatus 50 and each client apparatus 40 may be implemented by the same arrangement as that of the first embodiment, which has been described with reference to FIGS. 1 and 2.

The server apparatus 50 includes a policy setting module 51, a list management module 52, and a HDD 53. The HDD 53 stores policy information 51A and an identifier list 51B. The list management module 52 includes an update information reception module 521 and a list update module 522.

Each client apparatus 40 includes an identifier registration module 41 and a removable media monitor module 42. The identifier registration module 41 includes an identifier generation module 411, an identifier write module 412 and a update information transmission module 413. The removable media monitor module 42 includes a removable media detection module 421, an identifier read module 422, an identifier determination module 423, a policy decision module 424, and a removable media control module 425.

The policy setting module 51 included in the server apparatus 50 sets policies in the policy information 51A. The policies are used for controlling use of removable media connected to the client apparatuses 40. The policies include, for example, a first policy to be applied to a registered removable medium, and a second policy to be applied to an unregistered removable medium. The policy setting module 51 displays, for example, a setting screen used to set the policies. The policy setting module 51 sets the first policy and the second policy according to operations using the setting screen by the user (for example, a system administrator). The configuration of the policy information 51A is the same as that of the example described with reference to FIG. 9. The policies set by the policy setting module 51 are applied to a plurality of removable media connected to the one or more client apparatuses 40.

If a removable medium is connected to the client apparatus 40 and a registration request of that removable medium is issued, the identifier generation module 411 generates a media identifier for the connected removable medium. In the media identifier, a value that can uniquely identify the removable medium to be associated is set. The identifier generation module 411 generates a media identifier using (combining), for example, a manufacture number (serial number) of the client apparatus 40, a generation date and time, and a random number. The identifier generation module 411 may use a GUID generated using, for example, an API as a media identifier. The identifier generation module 411 outputs the generated media identifier to the identifier write module 412.

The identifier write module 412 writes the media identifier output from the identifier generation module 411 in a predetermined area in the connected removable medium. As has been described above with reference to FIG. 7, the identifier write module 412 writes the media identifier in, for example, a free area in a partition table area allocated in the removable medium, a free area in a file system management area allocated in the removable medium, or a specific data file stored in a user data area allocated in the removable medium. Then, the identifier write module 412 outputs the media identifier to the update information transmission module 413.

The update information transmission module 413 transmits the media identifier output from the identifier write module 412 to the server apparatus 50 (update information reception module 521) connected via the network.

The update information reception module 521 included in the server apparatus 50 receives the media identifier transmitted from the client apparatus 40. Then, the update information reception module 521 outputs the received media identifier to the list update module 522.

The list update module 522 stores the media identifier output from the update information reception module 521 in the identifier list 51B stored in the HDD 53. Therefore, every time a registration request of a removable medium is issued, a media identifier associated with that removable medium (a media identifier generated for that removable medium) is added to the identifier list 51B. The configuration of the identifier list 51B is the same as that of the example described with reference to FIG. 10.

If a removable medium is newly connected to the client apparatus 40, the removable media detection module 421 detects that the removable medium is newly connected to the client apparatus 40. The removable media detection module 421 detects, for example, a connection of a USB flash memory to a USB connector arranged on the client apparatus 40 and an insertion of a removable medium such as an SD card into a card slot. The removable media detection module 421 detects a connection between a removable medium and the client apparatus 40 using, for example, a notification (for example, a message) output from an OS. The removable media detection module 421 notifies the identifier read module 422 that the removable medium is newly connected to the client apparatus 40.

The identifier read module 422 reads data stored in a predetermined area in the connected removable medium in response to the notification from the removable media detection module 421. This predetermined area is an area specified to store a media identifier generated for that removable medium. More specifically, the identifier read module 422 reads data written in, for example, a predetermined area in a partition table area allocated in the removable medium, a predetermined area in a file system management area allocated in the removable medium, or a predetermined data file stored in a user data area allocated in the removable medium. Then, the identifier read module 422 outputs the read data to the identifier determination module 423.

The identifier determination module 423 reads the identifier list 51B stored in the server apparatus 50 via the network. Then, the identifier determination module 423 determines whether the read identifier list 51B includes a media identifier corresponding to the data output from the identifier read module 422. In other words, the identifier determination module 423 determines whether the media identifier included in the identifier list 51B is written in the predetermined area in the newly connected removable medium.

If the identifier list 51B includes the media identifier corresponding to the data output from the identifier read module 422, the identifier determination module 423 determines that the connected removable medium is a registered removable medium. Then, the identifier determination module 423 notifies the policy decision module 424 that the connected removable medium is a registered removable medium.

On the other hand, if the identifier list 51B does not include any media identifier corresponding to the data output from the identifier read module 422, the identifier determination module 423 determines that the connected removable medium is an unregistered removable medium. Then, the identifier determination module 423 notifies the policy decision module 424 that the connected removable medium is an unregistered removable medium.

The policy decision module 424 reads the policy information 51A stored in the server apparatus 50 via the network. The policy decision module 424 reads a policy from the read policy information 51A according to the notification from the identifier determination module 423. That is, if the policy decision module 424 is notified that the connected removable medium is a registered removable medium, the policy decision module 424 reads the first policy to be applied to a registered removable medium from the policy information 51A. On the other hand, if the policy decision module 424 is notified that the connected removable medium is an unregistered removable medium, the policy decision module 424 reads the second policy to be applied to an unregistered removable medium from the policy information 51A. The policy decision module 424 outputs the read policy to the removable media control module 425.

The removable media control module 425 controls use of the connected removable medium based on the policy output from the policy decision module 424. For example, the removable media control module 425 control permission or inhibition of use of the connected removable medium based on the policy output from the policy decision module 424.

For example, if the connected removable medium is a registered removable medium, and the read policy has a value "read/write permitted", the removable media control module 425 controls to permit reading data stored in the removable medium and writing data in the removable medium. Also, for example, if the connected removable medium is an unregistered removable medium, and the read policy has a value "use inhibited", the removable media control module 425 controls to inhibit reading data stored in the removable medium and writing data in the removable medium.

With the aforementioned configuration, use of removable media connected to the client apparatuses 40 can be controlled. When a removable medium is registered, the identifier generation module 411 generates a media identifier for that removable medium. Then, the identifier write module 412 writes the generated media identifier in a predetermined area in the removable medium. The list update module 522 stores the media identifier generated in the client apparatus 40 in the identifier list 51B stored in the server apparatus 50. Then, if the removable medium is newly connected to the client apparatus 40, the identifier determination module 423 can determine whether the removable medium of interest is a registered or unregistered removable medium based on data written in the predetermined area in that removable medium and the identifier list 51B. Then, the removable media control module 425 can control use of the newly connected removable medium in accordance with either the first policy or the second policy based on this determination result.

FIG. 15 shows an example of the configuration of a removable media management system 5 according to the third embodiment. The removable media management system 5 includes, for example, a server apparatus (management server) 50 and one or more client apparatuses 40. The server apparatus 50 and client apparatuses 40 are interconnected via a network 60 such as a LAN. The server apparatus 50 may be implemented by, for example, a server computer. Each client apparatus 40 may be implemented by, for example, a personal computer. The server apparatus 50 and each client apparatus 40 may be implemented by the same arrangement as that of the first embodiment, which has been described with reference to FIGS. 1 and 2.

The removable media management system 5 operates in, for example, one of a policy setting mode, removable media registration mode, removable media monitor mode, and list update mode. In the policy setting mode, policies to specify rules associated with use of removable media are set. In the removable media registration mode, a removable medium connected to each client apparatus 40 is newly registered. In the removable media monitor mode, use of a removable medium newly connected to the client apparatus 40 is controlled. In the list update mode, an identifier list 46B stored in the client apparatus 40 is updated.

The server apparatus 50 includes an identifier reception module 523, an identifier registration module 524, an identifier list transmission module 525, a user determination module 526, an identifier list storage 55, and a user list storage 57. The identifier list storage 55 and the user list storage 57 are implemented by, for example, a storage device such as an HDD. The identifier list storage 55 stores an identifier list 51B. The configuration of the identifier list 51B is the same as that of the example described with reference to FIG. 10.

The user list storage 57 stores a user list 57A. The user list 57A includes, for example, one or more pieces of user identification information (user IDs). Each user ID included in the user list 57A indicates that corresponding to a user who has an authority of new registration of a removable medium 22. As this user ID, for example, a login ID for the user to use the client apparatus 40 may be available. The user list 57A is created and updated by, for example, a system administrator.

Note that a storage area used as the identifier list storage 55 and that used as the user list storage 57 may be allocated in a storage device, and the identifier list 51B and user list 57A may be respectively stored in these areas. The server apparatus 50 may also include a policy setting module 51 and policy storage 56. The policy storage 56 is implemented by, for example, a storage device such as an HDD. The policy storage 56 stores policy information 51A. Note that a storage area used as the policy storage 56 may be allocated in a storage device, and the policy information 51A may be stored in this area.

Each client apparatus 40 includes an identifier generation module 411, an identifier write module 412, an identifier transmission module 414, a removable media registration module 415, a removable media detection module 421, an identifier read module 422, a removable media control module 425, a removable media determination module 426, an identifier list reception module 427, and an identifier list storage 46. The identifier list storage 46 is implemented by, for example, a storage device such as an HDD. The identifier list storage 46 stores the identifier list 46B. Note that a storage area used as the identifier list storage 46 may be allocated in a storage device, and the identifier list 46B may be stored in this area. The client apparatus 40 may also include a policy decision module 424.

The operations of the respective modules in the policy setting mode will be described below.

The policy setting module 51 included in the server apparatus 50 sets policies in the policy information 51A. The policies are used for controlling use of removable media 22 connected to the client apparatuses 40. The policies include, for example, a first policy to be applied to a registered removable medium, and a second policy to be applied to an unregistered removable medium. The policy setting module 51 displays, for example, a setting screen used to set the policies. The policy setting module 51 sets the first policy and the second policy according to operations using the setting screen by the user (for example, a system administrator). The configuration of the policy information 51A is the same as that of the example described with reference to FIG. 9. The policies set by the policy setting module 51 are applied to a plurality of removable media connected to the one or more client apparatuses 40. Note that the policy information 51A may be delivered to each client apparatus 40 and the delivered policy information 51A is stored in each client apparatus 40. In this case, as in the update process of the identifier list 46B, the server apparatus 50 transmits the policy information 51A to each client apparatus 40 when the client apparatus 40 is activated (booted), when the policy information 51A is updated, or at a predetermined period, thereby updating the policy information stored in the client apparatus 40.

Next, the operations of the respective modules in the removable media registration mode will be described below.

If a registration request of a removable medium is detected, the removable media registration module 415 in each client apparatus 40 transmits identification information (user ID) of the user who uses the client apparatus 40 to the user determination module 526 in the server apparatus 50. The registration request of a removable medium is issued by, for example, a user operation using an input screen. The identification information of the user to be transmitted is, for example, a login ID for that user to log into the client apparatus 40.

The user determination module 526 determines whether the user list 57A stored in the user list storage 57 includes the user ID transmitted by the removable media registration module 415. That is, the user determination module 526 determines whether the user corresponding to this user ID has a registration authority of removable media. If the user list 57A includes this user ID, the user determination module 526 transmits a notification, which indicates that registration of removable media is permitted, to the removable media registration module 415. On the other hand, if the user list 57A does not include this user ID, the user determination module 526 transmits a notification, which indicates that registration of removable media is not permitted, to the removable media registration module 415.

The removable media registration module 415 determines based on the notification transmitted from the user determination module 526 whether registration of removable media is permitted. If registration of removable media is not permitted, the removable media registration module 415 displays, for example, a message on a screen (LCD 17). The message indicates that registration of removable media has failed.

If registration of removable media is permitted, the removable media registration module 415 permits use of a removable medium. The removable media registration module 415 controls to allow to read a media identifier from a removable medium connected after this process by permitting use of a removable medium. Then, the removable media registration module 415 detects a removable medium 22 connected to the client apparatus 40. The removable media registration module 415 requests the identifier read module 422 to read identification information associated with that removable medium 22 from the detected removable medium 22.

In response to the request from the removable media registration module 415, the identifier read module 422 determines whether hardware identification information is embedded in the detected removable medium 22. If hardware identification information is embedded in the removable medium 22, the identifier read module 422 detects a serial number included in the embedded hardware identification information.

More specifically, assuming that the removable medium 22 is a USB flash memory, the identifier read module 422 acquires hardware identification information (hardware ID) specified by a vendor using, for example, a Win32 PnpEntity class provided by Windows™ Management Instrumentation (WMI). Device identification information indicates, for example, a device type, vendor name, product name, and serial number. The identifier read module 422 detects a hardware ID starting with "USBSTOR¥" or "USB¥ID" of the acquired hardware ID, thereby acquiring the hardware ID of the USB flash memory. The acquired hardware ID assumes, for example, the following value.

USBSTOR¥DISK&VEN_AAA&PROD_BBB&REV_0.1¥1234567890&0
USB¥VID_AAA&PID_CCC¥1234567890

If the aforementioned value is acquired, the identifier read module 422 detects a value "1234567890" of the value indicated by the hardware ID as a serial number of the USB flash memory (removable medium 22). Then, the identifier read module 422 outputs the detected serial number to the removable media registration module 415. Note that if a plurality of serial numbers are detected from one removable medium 22 (that is, if a plurality of serial numbers are embedded in one removable medium 22), the identifier read module 422 outputs all of these plurality of serial numbers to the removable media registration module 415. The removable media registration module 415 outputs the serial number output from the identifier read module 422 to the identifier transmission module 414. Note that information other than a serial number included in hardware identification information may be used as a media identifier.

If a serial number is not detected from the removable medium 22 (that is, if a serial number (hardware identification information) is not embedded in the removable medium 22), the identifier read module 422 determines whether a media identifier (software ID) is written in a predetermined area in the removable medium 22. If a media identifier is written in the predetermined area in the removable medium 22, the identifier read module 422 reads the media identifier from the predetermined area in the removable medium 22. This predetermined area is, for example, a free area between a master boot record area and partition area allocated in the removable medium 22. The predetermined area from which the media identifier is read will be described later with reference to FIGS. 16, 17, 18, and 19. The identifier read module 422 outputs the read media identifier to the identifier transmission module 414.

If a media identifier is not written in the predetermined area in the removable medium 22, the identifier read module 422 requests the identifier generation module 411 to generate a media identifier.

In response to the request from the identifier read module 422, the identifier generation module 411 generates a unique media identifier (e.g. Universally Unique Identifier: UUID) having a first length (for example, 16 bytes). As this unique media identifier, for example, a globally unique identifier (GUID) is used. Since the GUID is a 128-bit binary value, it can be used as a unique identifier which does not overlap other GUIDs.

The identifier generation module 411 generates a first validation value having a second length (for example, 4 bytes) using the generated media identifier. This first validation value is used to check validity of a media identifier when the media identifier is read from the removable medium 22. The identifier generation module 411 calculates the first validation value by, for example, dividing the generated media identifier into a plurality of data bit parts each having a second length (for example, 32 bits), and calculating an exclusive OR of these data bit parts. Therefore, for example, when the generated media identifier has a 16-byte (128 bit) length, the identifier generation module 411 detects four data bit parts each having a 32-bit length by dividing the media identifier by 32 bits from its start bit. Then, the identifier generation module 411 calculates an exclusive OR of these four data bit parts as the first validation value.

Then, the identifier generation module 411 outputs the generated media identifier and the calculated first validation value to the identifier write module 412. Also, the identifier generation module 411 outputs the generated media identifier to the identifier transmission module 414.

The identifier write module 412 writes the media identifier and first validation value output from the identifier generation module 411 in a predetermined area in the removable medium 22. This predetermined area is, for example, a free area between a master boot record area and partition area allocated in the removable medium 22. The predetermined area in which the media identifier is written will be described later with reference to FIGS. 16, 17, 18, and 19.

The identifier transmission module 414 transmits the serial number detected by the identifier read module 422, the media identifier read by the identifier read module 422, or the media identifier generated by the identifier generation module 411 as a media identifier for the removable medium 22 to the identifier reception module 523 in the server apparatus 50.

The configuration of a storage area in the removable medium 22 in which the media identifier is stored will be described below with reference to FIGS. 16, 17, 18, and 19.

FIG. 16 shows a configuration example of a storage area 70 allocated in the removable medium 22. In the storage area 70 of the removable medium 22, a master boot record (MBR) area 701, and a plurality of partition areas (first to fourth partition areas) 703 to 706 are allocated. A free area (that is, an unused area) 702 resides between the master boot record area 701 and partition area (first partition area) 703. For example, in Windows XP, the start position of the partition area 703 is set so as to allocate a free area 702 of 62 sectors between the master boot record area 701 and partition area 703. Also, for example, in Windows Vista, the start position of the partition area 703 is set so as to allocate a free area 702 of 2047 sectors between the master boot record area 701 and partition area 703. The size of this free area 702 can also be arbitrarily set by the user. Note that the start position of the partition area 703 is decided in accordance with a value indicating the start position which is described in a partition table stored in the master boot record area 701. The partition area 703 includes a partition boot record (PBR) area 703A and data area (user data area) 703B.

The media identifier is stored in a predetermined sector in the free area 702. That is, the aforementioned identifier write module 412 writes the media identifier in the predetermined sector in the free area 702. Also, the identifier read module 422 reads the media identifier written in the predetermined sector in the free area 702.

FIG. 17 shows another configuration example of a storage area 71 allocated in the removable medium 22. The storage area 71 of the removable medium 22 includes a single partition area 711. The partition area 711 includes a partition boot record (PBR) area 711A and data area (user data area) 711B.

If no free area to write a media identifier is allocated in the removable medium 22 like in this storage area 71, the identifier write module 412 creates a free area used to write a media identifier in the removable medium 22 in response to a media identifier write request (for example, in response to reception of the media identifier output from the identifier generation module 411). For example, the identifier write module 412 converts the storage area 71 of the removable medium 22 into an MBR format having a master boot record area, thereby converting the storage area 71 to a configuration including a free area between the master boot record area and partition area.

As shown in FIG. 18, the identifier write module 412 creates a free area 722 between a master boot record area 721 and a partition area 723 in the storage area 71 by creating these master boot record area 721 and single partition area 723. More specifically, the identifier write module 412 changes the partition boot record area 711A to the master boot record area 721. Then, the identifier write module 412 sets the start position of the partition area 723 at, for example, a 2048th-sector position using a partition table stored in the master boot record area 721. The identifier write module 412 creates the partition area 723, and formats the partition area 723 by a file system such as NTFS. Then, the removable medium 22 (storage area 71) can be configured, so that the free area 722 exists between the master boot record 721 and partition area 723. Note that the identifier write module 412 may save data stored in the original partition area 711 in another storage area, and may copy the saved data after the partition area 723 is created.

The media identifier is stored in a predetermined sector in the created free area 722. That is, the aforementioned identifier write module 412 writes the media identifier in the predetermined sector in the created free area 722. Also, the identifier read module 422 reads data written in the predetermined sector in the free area 722 as a media identifier.

FIG. 19 shows a storage example of a media identifier in the predetermined sector in the free area 702, 722. In this case, assume that the 2nd to 62nd sectors in the storage area 70, 71 are allocated as the free area 702, 722.

In response to a media identifier write request in the removable medium 22, the identifier write module 412 writes the media identifier in a predetermined sector (in this case, 10th sector) 76 in the free area 702, 722. More specifically, the media identifier is written in, for example, a start area 76A in the predetermined sector 76. This start area 76A has a size corresponding to the length (for example, 16 bytes) of the media identifier. Also, a first validation value is written in, for example, a last area 76B in the predetermined sector 76. This last area 76B has a size corresponding to the length (for example, 4 bytes) of the first validation value. Note that the identifier write module 412 may write a random number in all areas in the predetermined sector 76 before it writes the media identifier and first validation value. Alternatively, the identifier write module 412 may write a random number in a remaining area 76C after it writes the media identifier in the start area 76A and the first validation value in the last area 76B. Since reading the media identifier and first validation value from the removable medium 22 is made difficult by writing a random number, the removable medium 22 can be prevented from being abused.

If the media identifier is written in the free area 702, 722, as described above, it is never erased even if process for re-creating a partition or re-formatting process is applied to the removable medium 22. Therefore, this media identifier can be used as an identifier unique to the removable medium 22. That is, even if process for re-creating a partition or re-formatting process is applied to the removable medium 22, use of the removable medium 22 can be controlled using the media identifier written in the free area 702, 722.

In response to a media identifier read request from the removable medium 22, the identifier read module 422 reads the media identifier stored in the predetermined sector (in this case, 10th sector) 76 in the free area 702, 722. More specifically, the identifier read module 422 reads data (to be also referred to as identifier data) stored in, for example, the start area 76A in the predetermined sector 76 as a media identifier. This start area 76A has a size corresponding to the length (for example, 16 bytes) of the media identifier.

Referring back to FIG. 15, the identifier reception module 523 included in the server apparatus 50 receives the media identifier transmitted from the identifier transmission module 414. Then, the identifier reception module 523 outputs the received media identifier to the identifier registration module 524.

The identifier registration module 524 determines whether the identifier list 51B stored in the identifier list storage 55 includes the received media identifier. If the received media identifier is included in the identifier list 51B, the identifier registration module 524 transmits a notification to the removable media registration module 415. The notification indicates that the removable medium 22 associated with the received media identifier has already been registered.

Then, the removable media registration module 415 displays a message on a screen. The message indicates that the connected removable medium 22 has already been registered. The message may indicate that the media identifier stored in the removable medium 22 has already been registered in the identifier list 51B.

On the other hand, if the received media identifier is not included in the identifier list 51B, the identifier registration module 524 adds the received media identifier in the identifier list 51B. Then, the identifier registration module 524 transmits a notification, which indicates that registration of the removable medium 22 has succeeded, to the removable media registration module 415.

Then, the removable media registration module 415 displays a message on a screen. The message indicates that registration of the removable medium 22 is complete. The message may indicate that the media identifier stored in the removable medium 22 is added to the identifier list 51B.

With the above configuration, if the user who wants to newly register the removable medium 22 has a registration authority, the media identifier for that removable medium 22 is added to the identifier list 51B stored in the server apparatus 50, thereby registering the removable medium 22.

The operations of the respective modules in the removable media control mode will be described below.

The removable media detection module 421 detects that a removable medium 22 is newly connected to the client apparatus 40. The removable media detection module 421 notifies the identifier read module 422 that the removable medium 22 is newly connected to the client apparatus 40.

In response to the notification by the removable media detection module 421, the identifier read module 422 determines whether hardware identification information is embedded in the removable medium 22. If hardware identification information is embedded in the removable medium 22, the identifier read module 422 detects a serial number included in the embedded hardware identification information. The configuration for detecting the serial number by the identifier read module 422 is as has been described in the paragraphs of the removable media registration mode.

Next, the removable media determination module 426 determines whether the detected serial number is included in the identifier list 46B. That is, the removable media determination module 426 determines whether the newly connected removable medium 22 is a registered removable medium.

If the detected serial number is included in the identifier list 46B, that is, if the newly connected removable medium 22 is a registered removable medium, the policy decision module 424 reads the first policy to be applied to the registered removable medium 22 from the policy information 51A. On the other hand, if the acquired serial number is not included in the identifier list 46B, that is, if the newly connected removable medium 22 is an unregistered removable medium, the policy decision module 424 reads the second policy to be applied to the unregistered removable medium 22 from the policy information 51A.

On the other hand, if no serial number is embedded in the removable medium 22, the identifier read module 422 reads data stored in the predetermined area in the removable medium 22. As has been described above with reference to FIG. 19, the identifier read module 422 reads data (identifier data) written in the start area 76A as the media identifier. Also, the identifier read module 422 reads data (validation value data) written in the last area 76B as the first validation value. Then, the identifier read module 422 outputs the read media identifier and first validation value to the removable media determination module 426.

The removable media determination module 426 determines whether the newly connected removable medium 22 is a registered removable medium by using the media identifier and first validation value output from the identifier read module 422. More specifically, the removable media determination module 426 calculates a second validation value having the second length (for example, 4 bytes) using the media identifier by the same calculation method as that of the first validation value. The removable media determination module 426 calculates the second validation value by, for example, dividing the acquired media identifier into data bit parts each having the second length (for example, 4 bytes) and calculating an exclusive OR of these data bit parts. Therefore, when the acquired media identifier has a 16-byte length, the removable media determination module 426 divides the media identifier into four data bit parts each having a 32-bit length from its start bit. Then, the removable media determination module 426 calculates an exclusive OR of these four data bit parts as a second validation value.

Next, the removable media determination module 426 checks validity of the media identifier by comparing the first validation value and the calculated second validation value. More specifically, if the first validation value is equal to the second validation value, the removable media determination module 426 determines that the media identifier is valid. On the other hand, if the first validation value is not equal to the second validation value, the removable media determination module 426 determines that the media identifier is invalid. If the media identifier is invalid, the removable media determination module 426 determines that the newly connected removable medium 22 is an unregistered removable medium.

If the media identifier is valid, the removable media determination module 426 determines whether this media identifier is included in the identifier list 46B. If the media identifier is not included in the identifier list 46B, the removable media determination module 426 determines that the newly connected removable medium 22 is an unregistered removable medium. On the other hand, if the media identifier is included in the identifier list 46B, the removable media determination module 426 determines that the newly connected removable medium 22 is a registered removable medium.

The removable media determination module 426 outputs a notification, which indicates that the newly connected removable medium 22 is either a registered removable medium or an unregistered removable medium, to the removable media control module 425. Note that the removable media determination module 426 may output a notification, which indicates that the newly connected removable medium 22 is either a registered removable medium or an unregistered removable medium, to the policy decision module 424.

The removable media control module 425 controls use of the removable medium 22 according to the notification from the removable media determination module 426. For example, if the removable medium 22 is a registered removable medium, the removable media control module 425 permits use of the removable medium 22. On the other hand, for example, if the removable medium 22 is an unregistered removable medium, the removable media control module 425 controls to inhibit the removable medium 22 from being used by disabling the connection to the removable medium 22. For example, in order to control to inhibit the removable medium 22 from being used, the removable media control module 425 can use an API such as "SetupDiSetClassInstallParams( )" or "SetupDiCallClassInstaller( )" provided by Windows.

The removable media control module 425 can also control use of the removable medium 22 according to a predetermined policy. For example, this predetermined policy specifies to permit use of a registered removable medium (for example, to permit read and write accesses), and to inhibit use of an unregistered removable medium (for example, to inhibit read and write accesses).

As this predetermined policy, the policy output from the policy decision module 424 may be used. The policy decision module 424 reads a policy to be applied to the removable medium 22 from the policy information 51A in accordance with the notification from the removable media determination module 426. More specifically, if the newly connected removable medium 22 is a registered removable medium, the policy decision module 424 reads the first policy to be applied to the registered removable medium 22 from the policy information 51A. On the other hand, if the newly connected removable medium 22 is an unregistered removable medium, the policy decision module 424 reads the second policy to be applied to the unregistered removable medium 22 from the policy information 51A. Then, the policy decision module 424 outputs the read policy to the removable media control module 425.

Then, the removable media control module 425 controls use of the newly connected removable medium 22 based on the policy read by the policy decision module 424. For example, the removable media control module 425 controls permission or inhibition of use of the connected removable medium 22 based on the policy output from the policy decision module 424.

For example, if the connected removable medium 22 is a registered removable medium, and the read policy has a value "read/write permitted", the removable media control module 425 controls to permit reading data stored in the removable medium 22 and writing data in the removable medium 22. Also, for example, if the connected removable medium 22 is an unregistered removable medium, and the read policy has a value "use inhibited", the removable media control module 425 controls to inhibit reading data stored in the removable medium 22 and writing data in the removable medium 22.

With the above configuration, use of the removable medium 22 connected to the client apparatus 40 can be controlled. Note that use of the removable medium 22 may be controlled using only the media identifier without using hardware identification information such as a serial number. Using only the media identifier, use of the removable medium 22 can be controlled without using a serial number which may overlap among a plurality of removable media.

The operations of the respective modules in the list update mode will be described below.

The identifier list reception module 427 determines whether an update timing of the identifier list 46B stored in the identifier list storage 46 is reached. For example, when the client apparatus 40 is activated, when the user logs into the client apparatus 40, or when a predetermined period (for example, one hour) has elapsed since the previous update timing of the identifier list 46B, the identifier list reception module 427 determines that the update timing of the identifier list 46B is reached. Also, when a user operation is made (for example, when a new removable medium is registered), the identifier list reception module 427 may determine that an update timing of the identifier list 46B is reached.

When it is determined that the update timing of the identifier list 46B is reached, the identifier list reception module 427 transmits a transmission request signal of the identifier list 51B to the identifier list transmission module 525 included in the server apparatus 50 via the network 60.

The identifier list transmission module 525 receives the signal transmitted from the identifier list reception module 427. In response to reception of the signal, the identifier list transmission module 525 reads the identifier list 51B stored in the identifier list storage 55. Then, the identifier list transmission module 525 transmits the read identifier list 51B to the identifier list reception module 427.

The identifier list reception module 427 receives the identifier list 51B transmitted from the identifier list transmission module 525. Then, the identifier list reception module 427 updates the identifier list 46B stored in the identifier list storage 46 using the received identifier list 51B.

With the above configuration, the identifier list 46B stored in the client apparatus 40 can be updated using the identifier list 51B stored in the server apparatus 50.

An example of the procedure of media identifier registration process executed by the removable media management system 5 will be described below with reference to the flowchart shown in FIG. 20.

The removable media registration module 415 determines whether a removable media registration request is detected (block B300). If no removable media registration request is detected (NO in block B300), the removable media registration module 415 again determine whether a removable media registration request is detected by returning to block B300.

If a removable media registration request is detected (YES in block B300), the removable media registration module 415 transmits identification information (user ID) of the user who uses the client apparatus 40 to the user determination module 526 in the server apparatus 50 (block B301). The identification information of the user to be transmitted is, for example, a login ID for that user to log into the client apparatus 40.

The user determination module 526 receives the user ID transmitted from the removable media registration module 415. Then, the user determination module 526 determines whether the user list 57A stored in the user list storage 57 includes the received user ID (block B302). That is, the user determination module 526 determines whether the user corresponding to the received user ID has a registration authority of removable media. If the user list 57A includes the received user ID (YES in block B302), the user determination module 526 transmits a notification indicating that registration of removable media is permitted to the removable media registration module 415 (block B303). On the other hand, if the user list 57A does not include the received user ID (NO in block B302), the user determination module 526 transmits a notification indicating that registration of removable media is not permitted to the removable media registration module 415 (block B304).

The removable media registration module 415 receives the notification transmitted from the user determination module 526. Then, the removable media registration module 415 determines whether registration of removable media is permitted based on the received notification (block B305). If registration of removable media is not permitted (NO in block B305), the removable media registration module 415 displays a message indicating that registration of removable media has failed on a screen (LCD 17) (block B320).

If registration of removable media is permitted (YES in block B305), the removable media registration module 415 permits use of a removable medium (block B306). Then, the removable media registration module 415 detects a removable medium 22 connected to the client apparatus 40 (block B307). The identifier read module 422 determines whether a serial number (hardware ID) is embedded in the detected removable medium 22 (block B308). If a serial number is embedded in the removable medium 22 (YES in block B308), the identifier transmission module 414 transmits that serial number to the identifier reception module 523 in the server apparatus 50 as a media identifier of the removable medium 22 (block B309).

On the other hand, if no serial number is embedded in the removable medium 22 (NO in block B308), the identifier read module 422 determines whether a media identifier (software ID) is written in a predetermined area in the removable medium 22 (block B310). If a media identifier is written in the predetermined area in the removable medium 22 (YES in block B310), the identifier read module 422 reads the media identifier from the predetermined area in the removable medium 22. The identifier transmission unit 414 transmits the read media identifier to the identifier reception module 523 in the server apparatus 50 (block B313).

If no media identifier is written in the predetermined area in the removable medium 22 (NO in block B310), the identifier generation module 411 generates a unique media identifier (block B311). The identifier write module 412 writes the generated media identifier in the predetermined area in the removable medium 22 (block B312). Then, the identifier transmission module 414 transmits the generated media identifier to the identifier reception module 523 in the server apparatus 50 (block B313). Details of identifier write process corresponding to blocks B311 and B312 will be described later with reference to the flowchart shown in FIG. 21.

Next, the identifier reception module 523 receives the media identifier transmitted in block B309 or B313. Then, the identifier registration module 524 determines whether the received media identifier has already been registered in the identifier list 51B in the identifier list storage 55 (block B314). If the received media identifier has already been registered in the identifier list 51B (YES in block B314), the identifier registration module 524 transmits a notification indicating that the received media identifier has already been registered in the identifier list 51B to the removable media registration module 415 (block B315). The removable media registration module 415 displays a message indicating that the serial number embedded in the removable medium 22 or the media identifier written in the removable medium 22 has already been registered in the identifier list 51B on a screen (block B318).

On the other hand, if the received media identifier is not registered in the identifier list 51B (NO in block B314), the identifier registration module 524 adds the received media identifier to the identifier list 51B (block B316). Then, the identifier registration module 524 transmits a notification indicating that registration of the removable medium 22 has succeeded to the removable media registration module 415 (block B317). The removable media registration module 415 displays a message indicating that the serial number embedded in the removable medium 22 or the media identifier written in the removable medium 22 is registered in the identifier list 51B on a screen (block B319).

With the above process, when the user who wants to register a removable medium has a registration authority, the user can register a media identifier of the removable medium 22 connected to the client apparatus 40 in the identifier list 51B stored in the server apparatus 50.

FIG. 21 is a flowchart showing an example of the procedure of the identifier write process corresponding to blocks B311 and B312 in the media identifier registration process shown in FIG. 20.

The identifier generation module 411 generates a media identifier having the first length (block B41). The first length is, for example, 16 bytes. Next, the identifier write module 412 determines whether a free area to write the media identifier is allocated in the removable medium 22 (block B42). This free area is, for example, a storage area allocated between a master boot record area and partition area (first partition). If no free area is allocated in the removable medium 22 (NO in block B42), the identifier write module 412 creates a free area in the removable medium 22 (block B43). The free area is used to write the media identifier. The identifier write module 412 creates a master boot area, a partition area, and a free area between the master boot area and partition area in the removable medium 22.

If the free area is allocated in the removable medium 22 (YES in block B42), or after the free area used to write the media identifier is created in block B43, the identifier write module 412 writes a random number in a write target sector in the removable medium 22 (block B44). More specifically, the identifier write module 412 generates a random number to be written in the write target sector. Then, the identifier write module 412 writes the generated random number in the write target sector. This write target sector is, for example, one of a plurality of sectors included in the free area between the master boot record area and partition area (first partition).

The identifier write module 412 writes the generated media identifier in a start area in the write target sector (block B45). For example, when the generated media identifier has a 16-byte length, the identifier write module 412 writes the generated media identifier in an area from the first byte to the 16th byte in the write target sector.

Then, the identifier generation module 411 calculates a first validation value using the generated media identifier (block B46). The identifier generation module 411 generates the first validation value by, for example, dividing the generated media identifier into a plurality of data bit parts each having the second length, and calculating an XOR of these data bit parts. This second length is, for example, 4 bytes (=32 bits). Therefore, for example, if the generated media identifier has a 16-byte length, the identifier generation module 411 divides the media identifier into four data bit parts each having a 32-bit length. Then, the identifier generation module 411 calculates an XOR using these four values. That is, an XOR having a 32-bit length is calculated as the first validation value.

The identifier write module 412 writes the calculated first validation value in a last area of the write target sector (block B47). Therefore, for example, if the calculated first validation value has a 4-byte length, the identifier write module 412 writes the calculated first validation value in a 4-byte area from the last byte in the write target sector.

With the above process, the media identifier and first validation value can be written in the predetermined area in the removable medium 22. This predetermined area is, for example, the free area between the master boot record area and partition area. Even if this free area is not allocated in the removable medium 22, a free area is created in the removable medium 22, and then the media identifier and first validation value can be written in the predetermined area in the removable medium 22.

Figure 22:
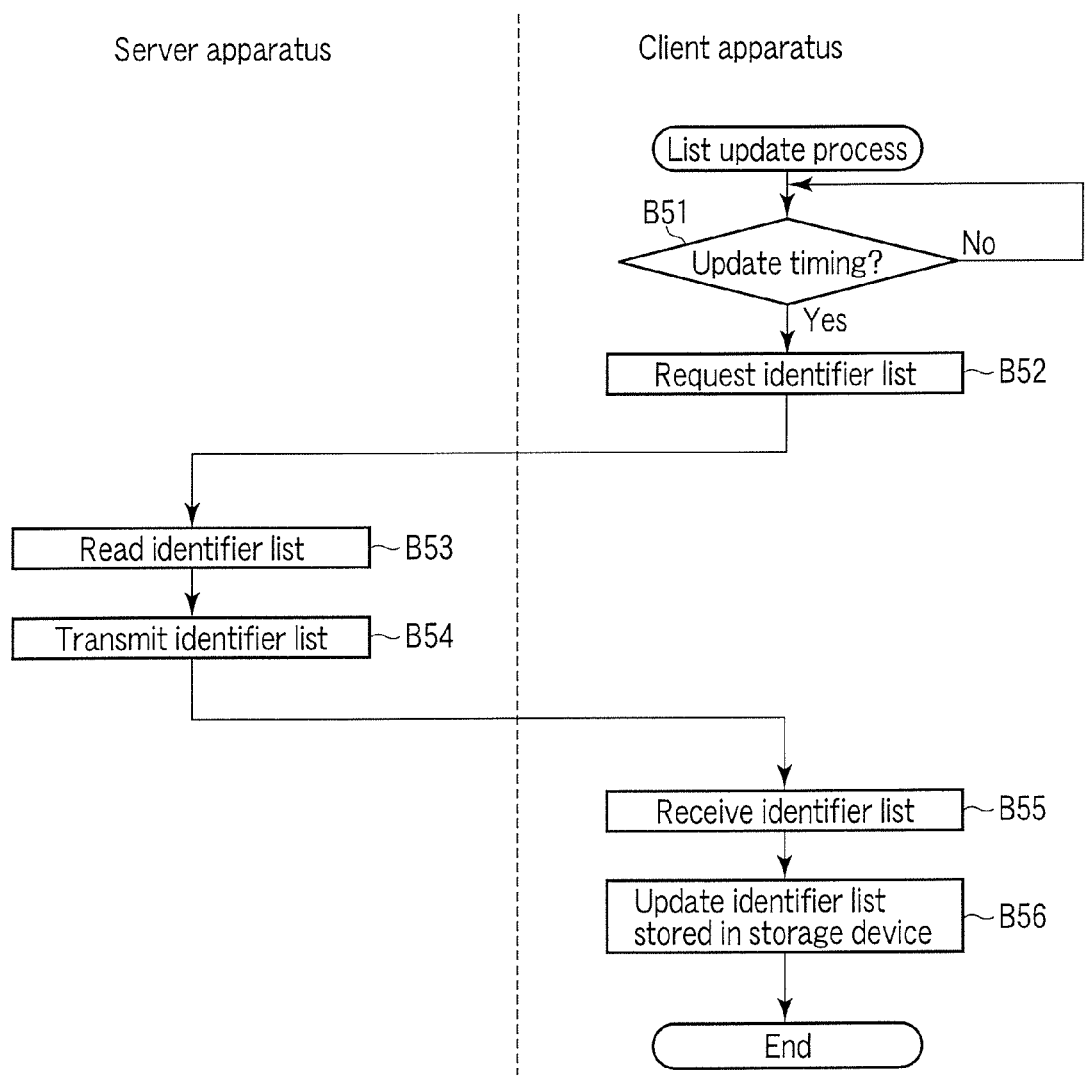
FIG. 22 is an exemplary flowchart showing an example of the procedure of identifier list update process executed by the removable media management system according to the third embodiment.

An example of the procedure of the identifier list update process will be described below with reference to the flowchart shown in FIG. 22.

The identifier list reception module 427 determines whether the update timing of the identifier list 46B stored in the identifier list storage 46 is reached (block B51). If it is determined that the update timing of the identifier list 46B is not reached (NO in block B51), the identifier list reception module 427 determines whether the update timing of the identifier list 46B is reached by returning to block B51.

If it is determined that the update timing of the identifier list 46B is reached (YES in block B51), the identifier list reception module 427 requests the identifier list transmission module 525 in the server apparatus 50 to transmit the identifier list (block B52).

In response to the request of the identifier list reception module 427, the identifier list transmission module 525 reads the identifier list 51B in the identifier list storage 55 (block B53). Then, the identifier list transmission module 525 transmits the read identifier list 51B to the identifier list reception module 427 (block B54).

The identifier list reception module 427 receives the identifier list 51B transmitted from the identifier list transmission module 525 (block B55). Then, the identifier list reception module 427 updates the identifier list 46B in the identifier list storage 46 using the received identifier list 51B (block B56).

With the above process, the identifier list 46B in the client apparatus 40 can be updated using the identifier list 51B in the server apparatus 50.

Figure 23:
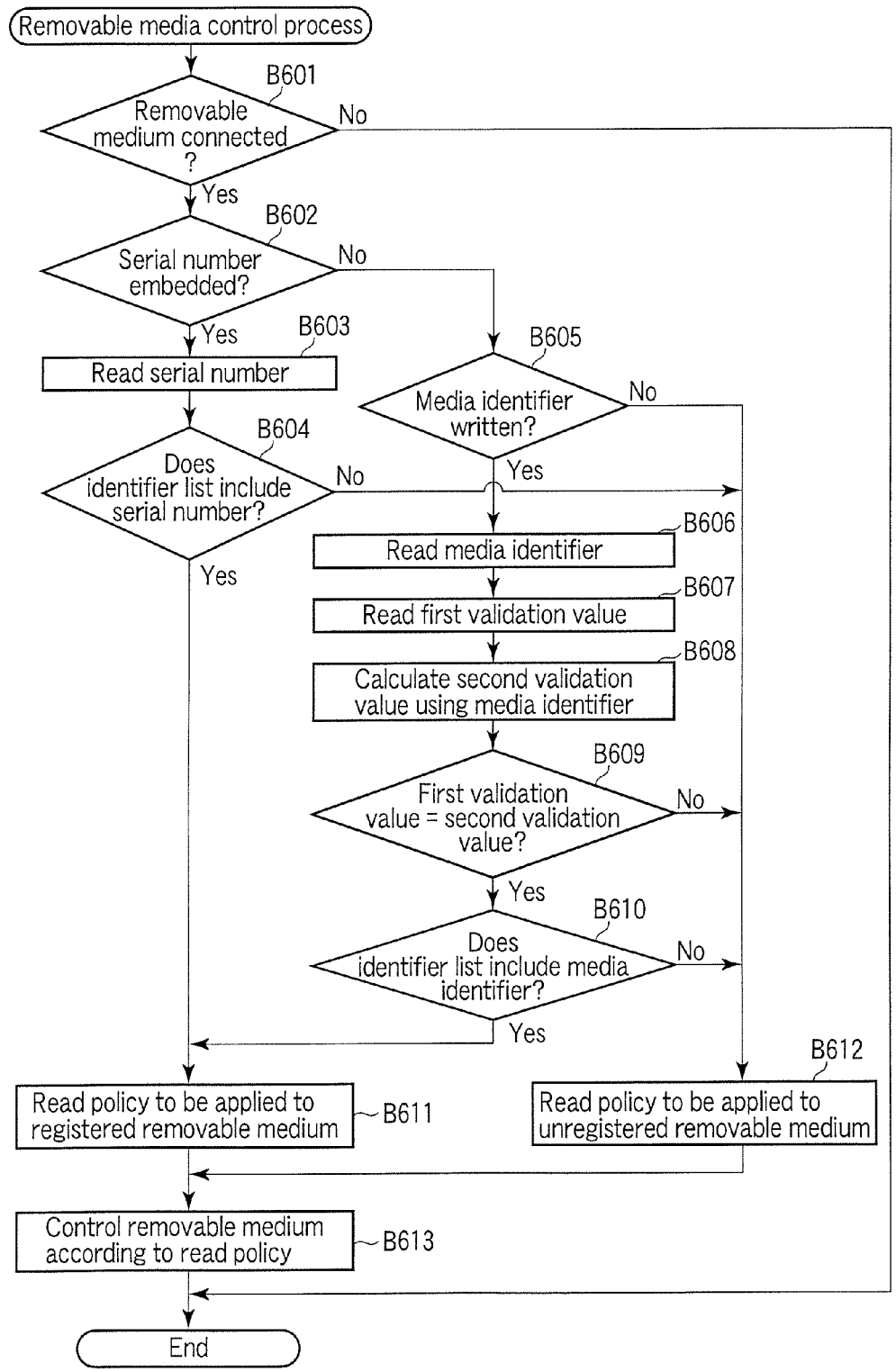
FIG. 23 is an exemplary flowchart showing an example of the procedure of removable media control process executed by the removable media management system according to the third embodiment.

FIG. 23 shows an example of the procedure of the removable media control process executed by the removable media management system 5.

The removable media detection module 421 determines whether a removable medium is newly connected to the client apparatus 40 (block B601). If no removable medium is newly connected to the client apparatus 40 (NO in block B601), the removable media detection module 421 again determine whether a removable medium is newly connected to the client apparatus 40 by returning to block B601.

If a removable medium is newly connected to the client apparatus 40 (YES in block B601), the identifier read module 422 determines whether a serial number is embedded in the removable medium 22 (block B602). For example, the identifier read module 422 determines whether hardware identification information including, for example, a vendor ID, product ID, and serial number is embedded in the removable medium 22.

If a serial number is embedded in the removable medium 22 (YES in block B602), the identifier read module 422 reads the serial number embedded in the removable medium 22 (block B603). Then, the removable media determination module 426 determines whether the identifier list 46B includes the read serial number (block B604). That is, the removable media determination module 426 determines whether the newly connected removable medium 22 is a registered removable medium.

If the identifier list 46B includes the read serial number (YES in block B604), that is, if the newly connected removable medium 22 is a registered removable medium, the policy decision module 424 reads the first policy to be applied to the registered removable medium 22 from the policy information 51A (block B611). On the other hand, if the identifier list 46B does not include the read serial number (NO in block B604), that is, if the newly connected removable medium 22 is an unregistered removable medium, the policy decision module 424 reads the second policy to be applied to the unregistered removable medium 22 from the policy information 51A (block B612).

On the other hand, if no serial number is embedded in the removable medium 22 (NO in block B602), the identifier read module 422 determines whether a media identifier is written in a first area in the removable medium 22 (block B605). If no media identifier is written in the first area in the removable medium 22 (NO in block B605), that is, if the newly connected removable medium 22 is an unregistered removable medium, the policy decision module 424 reads the second policy to be applied to the unregistered removable medium 22 from the policy information 51A (block B612).

On the other hand, if the media identifier is written in the first area in the removable medium 22 (YES in block B605), the identifier read module 422 reads the media identifier stored in the first area in the removable medium 22 (block B606). Also, the identifier read module 422 reads a first validation value stored in a second area in the removable medium 22 (block B607).

Next, the removable media determination module 426 calculates a second validation value using the read media identifier (block B608). Then, the removable media determination module 426 determines whether the read first validation value is equal to the calculated second validation value (block B609). If the first validation value is equal to the second validation value (YES in block B609), the removable media determination module 426 determines whether the identifier list 46B includes the read media identifier (block B610). If the identifier list 46B includes the read media identifier (YES in block B610), that is, if the newly connected removable medium 22 is a registered removable medium, the policy decision module 424 reads the first policy to be applied to the registered removable medium 22 from the policy information 51A (block B611).

If the first validation value is not equal to the second validation value (NO in block B609), or if the identifier list 46B does not include the read media identifier (NO in block B610), the policy decision module 424 reads the second policy to be applied to the unregistered removable medium 22 from the policy information 51A (block B612).

Then, the removable media control module 425 controls use of the newly connected removable medium 22 based on the policy read in block B611 or B612 (block B613).

With the above process, use of the removable medium 22 can be controlled using the hardware identification information (serial number) embedded in the removable medium 22 or the media identifier for the removable medium 22.

FIG. 24 shows the configuration of a removable media management system 6 according to the fourth embodiment. The removable media management system 6 includes, for example, a server apparatus 50, a client apparatus 40 (to be also referred to as a first client apparatus hereinafter), and a removable media registration apparatus 45 (to be also referred to as a second client apparatus hereinafter). The server apparatus 50 and client apparatus 40 are interconnected via a network 60 such as a LAN. Also, the server apparatus 50 and removable media registration apparatus 45 are interconnected via the network 60. The server apparatus 50 may be implemented by, for example, a server computer. The client apparatus 40 may be implemented by, for example, a personal computer. The removable media registration apparatus 45 may be implemented by, for example, a personal computer. The server apparatus 50, client apparatus 40 and removable media registration apparatus 45 may be implemented by the same arrangement as that of the first embodiment, which has been described with reference to FIGS. 1 and 2.

The removable media management system 6 operates in, for example, one of a policy setting mode, removable media registration mode, removable media monitor mode, and list update mode. In the policy setting mode, policies to specify rules associated with use of removable media are set. In the removable media registration mode, a removable medium connected to the removable media registration apparatus 45 is newly registered. In the removable media monitor mode, use of a removable medium newly connected to the client apparatus 40 is controlled. In the list update mode, an identifier list 46B stored in the client apparatus 40 is updated.

The server apparatus 50 includes an identifier reception module 523, an identifier registration module 524, an identifier list transmission module 525, a user determination module 526, an identifier list storage 55, and a user list storage 57. The identifier list storage 55 and user list storage 57 are implemented by, for example, a storage device such as an HDD. The identifier list storage 55 stores an identifier list 51B. The server apparatus 50 may also include a policy setting module 51 and a policy storage 56. The policy storage 56 stores policy information 51A.

The removable media registration apparatus 45 includes an identifier generation module 451, an identifier read module 452, an identifier write module 453, an identifier transmission module 454, and a removable media registration module 455.

The client apparatus 40 includes a removable media detection module 421, an identifier read module 422, a removable media control module 425, a removable media determination module 426, an identifier list reception module 427, and an identifier list storage 46. The identifier list storage 46 stores the identifier list 46B. The client apparatus 40 may also include a policy decision module 424.

The server apparatus 50 implements operations in the policy setting mode to set policies used to control use of a removable medium 22B connected to the client apparatus 40. The server apparatus 50 and removable media registration apparatus 45 implement operations in the removable media registration mode to register a removable medium 22A connected to the removable media registration apparatus 45. Also, the server apparatus 50 and client apparatus 40 implement operations in the list update mode to update the identifier list 46B stored in the client apparatus 40. Note that the detailed operations in the respective modes are the same as those described with reference to FIG. 15 (third embodiment).

The removable media management system 6 includes the removable media registration apparatus 45 used to register a removable medium 22A. Since the dedicated removable media registration apparatus 45 used to register the removable medium 22A is arranged, the user is inhibited from registering removable media using the client apparatus 40 which is normally used by the user. For example, by setting the removable media registration apparatus 45 at a place where only a system administrator can use that apparatus, registration of removable media or use of the client apparatus 40 by an unauthorized user can be prevented. In such case, process for determining whether the user who wants to register the removable medium 22A has an authority can be omitted.

As described above, according to the above embodiments, use of a removable medium can be controlled. In the above embodiments, in response to a registration request of a removable medium, a media identifier for a connected removable medium is generated, and the generated media identifier is written in a predetermined area in the removable medium. Also, the generated media identifier is stored in an identifier list.

When a removable medium is newly connected, whether that removable medium is either a registered or unregistered removable medium is determined based on data (media identifier) written in the predetermined area in the removable medium and the identifier list. Then, use of the connected removable medium is controlled to follow a corresponding policy according to the determination result.

Note that all the procedures of the registration process, removable media control process, and list update process of the above embodiments can be implemented by software. By only installing a program used to execute the procedures of the registration process, removable media control process, and list update process in a normal computer via a computer-readable storage medium that stores the program, and executing the installed program, the same effects as those of the above embodiments can be easily attained.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
an identifier generation module configured to generate a media identifier for a removable medium connected to the information processing apparatus, the generated media identifier having a first length;
an identifier write module configured to write the generated media identifier in a free area between a master boot record area and a partition area in the removable medium;
an identifier storage configured to store the generated media identifier in an identifier list;
a removable media control module configured to permit use of a removable medium, when the removable medium is newly connected to the information processing apparatus, and if a media identifier included in the identifier list is written in the free area in the newly connected removable medium;
a first validation value calculation module configured to calculate a first validation value using the generated media identifier, the first validation value calculation module is configured to calculate the first validation value by dividing the generated media identifier into a plurality of data bit parts each having a second length shorter than the first length, and calculating an exclusive OR of the plurality of data bit parts,
wherein the identifier write module is configured to further write the calculated first validation value in the free area.

2. The information processing apparatus of claim 1, further comprising:
an area creation module configured to create the free area in the removable medium if the free area is not included in the removable medium,
wherein the identifier write module is configured to write the generated media identifier in the created free area.

3. The information processing apparatus of claim 1, wherein the identifier write module is configured to write the generated media identifier in a start area in a predetermined sector in the free area, and to write the calculated first validation value in a last area in the predetermined sector.

4. The information processing apparatus of claim 3, wherein the identifier write module is configured to write the generated media identifier in the start area, to write the calculated first validation value in the last area, and to write a random number in a remaining area in the predetermined sector.

5. The information processing apparatus of Claim 1, further comprising:
an identifier read module configured to read identifier data and validation value data from the newly connected removable medium, the identifier data being stored in a start area in a predetermined sector in the free area and having the first length, the validation value data being stored in a last area in the predetermined sector and having the second length; and a second validation value calculation module configured to calculate a second validation value by dividing a value of the read identifier data into a plurality of data bit parts each having the second length shorter than the first length, and calculating an exclusive OR of the plurality of data bit parts, wherein the removable media control module is configured to permit the use of the newly connected removable medium if a value of the read validation data is equal to the second validation value and the value of the read identifier data is included in the identifier list.

6. The information processing apparatus of claim 1, wherein when the removable medium is newly connected to the information processing apparatus, the removable media control module is configured to permit the use of the newly connected removable medium if hardware identification information is embedded in the newly connected removable medium and the hardware identification information is included in the identifier list or if hardware identification information is not embedded in the newly connected removable medium and a media identifier included in the identifier list is written in the free area in the newly connected removable medium.

7. The information processing apparatus of claim 1, further comprising:

a policy setting module configured to set a policy, wherein when the removable medium is newly connected to the information processing apparatus, the removable media control module is configured to control the use of the newly connected removable medium according to the policy if a media identifier included in the identifier list is written in the free area in the newly connected removable medium.

8. The information processing apparatus of claim 7, wherein the policy specifies permission of reading data from the newly connected removable medium and permission of writing data to the removable medium, permission of reading data from the removable medium and inhibition of writing data to the removable medium, or inhibition of reading data from the removable medium and inhibition of writing data to the removable medium.

9. The information processing apparatus of claim 8, wherein the policy setting module is configured to set a first policy and a second policy, and when the removable medium is newly connected to the information processing apparatus, the removable media control module is configured to control the use of the newly connected removable medium according to the first policy if a media identifier included in the identifier list is written in the free area in the newly connected removable medium, and to control the use of the newly connected removable medium according to the second policy if any media identifier included in the identifier list is not written in the free area in the newly connected removable medium.

10. The information processing apparatus of claim 9, wherein the first policy and the second policy respectively specify permission of reading data from the newly connected removable medium and permission of writing data to the removable medium, permission of reading data from the removable medium and inhibition of writing data to the removable medium, or inhibition of reading data from the removable medium and inhibition of writing data to the removable medium.

* * * * *